US006676412B1

(12) United States Patent
Masterson et al.

(10) Patent No.: US 6,676,412 B1
(45) Date of Patent: Jan. 13, 2004

(54) ASSESSMENT OF SPELLING AND RELATED SKILLS

(75) Inventors: Julie J. Masterson, Springfield, MO (US); Kenn Apel, Bellingham, WA (US); Jan Wasowicz, Evanston, IL (US)

(73) Assignee: Learning by Design, Inc., Evanston, IL (US)

( * ) Notice: Subject to any disclaimer, the term of this patent is extended or adjusted under 35 U.S.C. 154(b) by 138 days.

(21) Appl. No.: 09/684,570

(22) Filed: Oct. 6, 2000

Related U.S. Application Data

(60) Provisional application No. 60/158,459, filed on Oct. 8, 1999.

(51) Int. Cl.$^7$ ............................................... G09B 11/00
(52) U.S. Cl. ...................... 434/169; 434/307 R; 704/1
(58) Field of Search ................................ 434/156, 157, 434/167, 169; 704/1, 237, 270, 276

(56) References Cited

U.S. PATENT DOCUMENTS

| 5,255,925 | A | | 10/1993 | Small |
| 5,421,731 | A | | 6/1995 | Walker |
| 5,692,906 | A | * | 12/1997 | Corder ........................ 434/118 |
| 6,081,772 | A | * | 6/2000 | Lewis ............................ 704/1 |
| 6,146,147 | A | | 11/2000 | Wasowicz |
| 6,227,863 | B1 | * | 5/2001 | Spector ........................ 434/156 |
| 6,299,452 | B1 | | 10/2001 | Wasowicz et al. |

OTHER PUBLICATIONS

Linnea C. Ehri & Lee S. Wilce, "Recognition of Spellings Printed in Lower and Mixed Case: Evidence for Orthographic Images," *Journal of Reading Behavior*, 1982, vol. XIV, No. 3, pp. 219–230.

Virginia A. Mann, Paula Tobin, and Rebecca Wilson, "Measuring Phonological Awareness Through the Invented Spellings of Kindergarten Children," *Merrill–Palmer Quarterly*, Jul. 1987, vol. 33, No. 3, pp. 365–391.

Joanne F. Carlisle, "The Use of Morphological Knowledge in Spelling Derived Forms by Learning–Disabled and Normal Students," *Annals of Dyslexia*, 1982, vol. 37, pp. 90–108.

Margaret Bruck & Gloria Waters, "An Analysis of the Spelling Errors of Children Who Differ in Their Reading and Spelling Skills," *Applied Psycholinguistics*, 1988, vol. 9, pp. 77–92.

Joanne F. Carlisle, "Knowledge of Derivational Morphology and Spelling Ability in Fourth, Sixth, and Eighth Graders," *Applied Psycholinguistics*, 1988, vol. 9, pp. 247–266.

Carol S. Dweck & Ellen L. Leggett, "A Social–Cognitive Approach to Motivation and Personality," *Psychological Review*, 1988, vol. 95, No. 2, pp. 256–273.

Hallie Kay Yopp, "Developing Phonemic Awareness in Young Children," *The Reading Teacher*, May 1992, vol. 45, No. 9, pp. 696–703.

(List continued on next page.)

Primary Examiner—Joe H. Cheng
Assistant Examiner—Kathleen M Christman
(74) Attorney, Agent, or Firm—Michael Best & Friedrich; Larry L. Saret

(57) ABSTRACT

A method of spelling assessment includes identifying misspelled words; describing error patterns; analyzing, for a given spelling error, whether the target word is a base word or is derived or inflected; and assessing the student's phonological awareness, visual orthographic memory, orthographic knowledge, and morphological awareness skills based thereon. An embodiment of the method comprises aligning the student's misspelling with the corresponding letters in the correctly spelled target word. An apparatus implements the method.

8 Claims, 18 Drawing Sheets

OTHER PUBLICATIONS

Joanne F. Carlisle & Diana M. Nomanbhoy, "Phonological and Morphological Awareness in First Graders," *Applied Psycholinguistics*, 1993, vol. 14, pp. 177–195.

Linda K. Swank & Hugh W. Catts, "Phonological Awareness and Written Word Decoding," *Language, Speech, and Hearing Services in Schools*, Jan. 1994, vol. 25, pp. 9–14.

Benita A. Blachman, "What We Have Learned from Longitudinal Studies of Phonological Processing and Reading, and Some Unanswered Questions: A Response to Torgeson, Wagner, and Rashotte," *Journal of Learning Disabilities*, May 1994, vol. 27, No. 5, pp. 287–291.

Rebecca Treiman, Marie Cassar & Andrea Zukowski, "What Types of Linguistic Information Do Children Use in Spelling? The Case of Flaps," *Child Development*, 1994, vol. 65, pp. 1318–1337.

Kathleen M. Cain & Carol S. Dweck, "The Relation Between Motivational Patterns and Archievement Cognitions Through the Elementary School Years," *Merrill–Palmer Quarterly*, Jan. 1995, vol. 41, No. 1, pp. 25–52.

Karen Klein Burhans & Carol S. Dweck, "Helplessness in Early Childhood: The Role of Contingent Worth," *Child Development*, 1995, vol. 66, pp. 1719–1738.

Jo Worthy & Neva M. Viise, "Morphological, Phonological, and Orthographic Differences Between the Spelling of Normally Achieving Children and Basic Literacy Adults," *Reading and Writing: An Interdisciplinary Journal*, Apr. 1996, vol. 8, pp. 139–159.

Carolyn Lennox & Linda S. Siegel, "The Development of Phonological Rules and visual Strategies in Average and Poor Spellers," *Journal of Experimental Child Psychology*, 1996, vol. 62, pp. 60–83.

Kathryn L. Laframboise, "Developmental Spelling in Fourth Grade: An Analysis of What Poor Readers Do," *Reading Horizons*, 1996, vol. 36, pp. 231–248.

Kate Nation & Charles Hulme, "Phonemic Segmentation, not Onset–Rime Segmentation, Predicts Early Reading and Spelling Skills," *Reading Research Quarterly*, Apr./May/Jun. 1997, vol. 32, No. 2, pp. 154–167.

Terezinha Nunes, Peter Bryant & Miriam Bindman, "Learning to Spell Regular and Irregular Verbs," *Reading and Writing: An Intersdisciplinary Journal*, 1997, vol. 9, pp. 427–449.

Terezinha Nunes, Peter Bryant & Miriam Bindman, "Morpholigical Spelling Strategies: Developmental Stages and Processes," *Developmental Psychology*, 1997, vol. 33, No. 4, pp. 637–649.

Julie J. Masterson, Leigh Anne Crede, "Learning to Spell: Implications for Assessment and Intervention," *Language, Speech, and Hearing Services in Schools*, Jul. 1999, vol. 30, pp. 243–254.

Melissa L. Kamins & Dweck, "Person Versus Process Praise and Criticism: Implications for Contingent Self–Worth and Coping," *Developmental Psychology*, 1999, vol. 35, No. 3, pp. 835–847.

Rebecca Treiman, PhD, & Derrick C. Bourassa, PhD, "The Development of Spelling Skill," *Topics in Language Disorder*, May 2000, pp. 1–18.

Linnea C. Ehri, PhD, "Learning to Read and Learning to Spell: Two Sides of a Coin," *Topics in Language Disorder*, May 2000, pp. 19–36.

Alan G. Kamhi, PhD, & Linette N. Hinton, MA, "Explaining Individual Differences in Spelling Ability," *Topics in Language Disorder*, May 2000, pp. 37–49.

Cheryl M. Scott, PhD, "Principles and Methods of Spelling Instruction: Applications for Poor Spellers," *Topics in Language Disorder*, May 2000, pp. 66–82.

Uta Frith, "Unexpected Spelling Problems," pp. 495–514.

Jerry Zutell, "Children's Spelling Strategies and Their Cognitive Development," pp. 52–73.

Joanne F. Carlisle, "Morphological Awareness and Early Reading Achievement," pp. 189–209.

Bruce L. Derwing, Martha L. Smith, & Grace E. Wiebe, "On the Role of Spelling in Morpheme Recognition: Experimental Studies with Children and Adults," pp. 3–23.

Donald R. Bear, Shane Templeton, & Michael Warner, "The Development of a Qualitative Inventory of Higher Levels of Orthographic Knowledge," *Learner Factors/Teacher Factors*, pp. 105–110.

Patricia Glenn & Sandra Rollins Hurley, "Preventing Spelling Disabilities," *Child Language Teaching and Therapy*, pp. 1–12.

Louisa Cook Moats, "Assessment of Spelling in Learning Disabilities Research," pp. 333–349.

Valerie Muter, "Phonological Awareness: Its Nature and Its Influence Over Early Literacy Development," pp. 113–125.

Joseph K. Torgesen, "Assessment and Instruction for Phenomic Awareness and Word Recognition Skills," pp. 128–153.

Anne E. Fowler & Isabelle Y. Liberman, "The Role of Phonology and Orthograhy in Morphological Awareness," pp. 157–188.

* cited by examiner

ASSESSMENT OF SPELLING AND RELATED SKILLS

CROSS-REFERENCE TO RELATED APPLICATION

The present application is a continuation in part of provisional U.S. Patent Application Serial No. 60/158,454 filed on Oct. 8, 1999, now abandoned.

BACKGROUND OF THE INVENTION

1. Field of the Invention

The present invention relates generally to diagnostic testing and assessment. More particularly, the present invention relates generally to diagnostic testing and assessment regarding spelling.

2. Description of the Related Art

As the study of language development has broadened over the years to include the recognition of reading and spelling as language skills, so, too, has the need to develop systematic and informative procedures for determining deficiencies in literate language development. Unfortunately, unlike the readily available literature on the assessment of early language skills, few specific guides for comprehensive literacy skills assessment are available. This is most notably apparent for spelling assessment. Without a well-designed method for determining the presence of a disability and the possible factor(s) that may be causing the disability, language and literacy specialists may be less effective in their spelling intervention.

There are three basic methods used to determine the status of a student's spelling skills. In the first, dictation, the examiner reads aloud a list of words and the student is instructed to write the spelling for each. In the second, connected writing, the student is asked to generate text in response to a picture or as a story retell. In the third, recognition, the student is given a group of words that contain the correct spelling along with a few misspellings, or foils. The student is asked to indicate which spelling is correct.

Dictation—Standardized Tests

There are several standardized tests or subtests that employ dictated word lists. A raw score is calculated from each test or subtest and then converted into derived scores, such as a standard score/quotient, percentile, age equivalency and grade equivalency. These tests meet the minimal standards of the American Psychological Association for technical adequacy. Consequently, clinicians or teachers who must have a standard score for justification of placement in special education services may benefit from administration and scoring of one of these tests or subtests. However, Moats judged the tests inadequate for sufficiently sampling the domain of spelling, or the child's knowledge of English orthographic patterns.

Dictation—Word Inventories

The use of word lists to evaluate spelling skills has been in practice for decades. Many spelling text books have short test lists that precede each instructional unit. Approaches that are based upon typical spelling development often employ word lists to elicit data for. Examples include the inventory lists that appear in Tables 1 and 2. These lists are valuable because they are designed to elicit words that represent specific types of spelling knowledge that occur at various points in the developmental process.

The domain of spelling is large, incorporating knowledge of orthographic patterns, sound-symbol correspondences, homophones, compounds, and morphological constructions (e.g., contractions, Latin plurals, and assimilated prefixes). Table 3 illustrates a content domain in English spelling. However, there is no single, comprehensive list that can be used to gather all pertinent data. Further, the nature of data that would be desired would be dependent upon the developmental level of the student being evaluated. Other such lists can be helpful with students who are in the earliest stages of spelling acquisition or when assessing students who are at the intermediate stages of spelling acquisition. These lists are scored by a variety of methods, including calculation of the number correct; identifying levels of mastery, instruction, and frustration; and analysis of the types or features of the spellings that are used. Many of these methods yield some type of developmental level, which can be used to determine whether a student is at the expected level of spelling proficiency. Regardless of which list is chosen, the wise language and literacy specialist will realize that it likely represents a starting point for data collection, and, depending on the profile of correct and error spellings used by the child, additional data will likely be necessary.

Connected Writing

Some language and literacy specialists may be concerned about using only word lists in spelling assessment because lists are decontextualized and have no communicative value. Further, performance on word lists often does not mirror spelling during actual classroom writing tasks. Parents and professionals often lament the fact that children will score high on weekly spelling tests, yet continue to misspell numerous words in connected writing. Spelling accuracy may be influenced by the writing topic, motivation to write accurately, attention to task, and response mode (e.g., computer versus handwriting).

There are a few standardized tests with subtests designed to measure spelling skills in connected writing. For example, on one such test, the student is asked to generate a written story in response to a stimulus picture. Data are scored by subtracting the number of different misspelled words in the story from the total number of different words in the story. The raw scores may be converted to a percentile or standard score. Unfortunately, such subtests simply do not contain a sufficient number of words representing the necessary orthographic patterns to make the scores meaningful or helpful.

Another type of test involves the use of retellings to gather additional data on error patterns initially identified through single-word dictation tasks. Words are selected that represent three or four error patterns of interest and construct a story that contains those words. The child writes the story as it is told by the examiner. The examiner tells the story in narrative fashion, pausing between story elements so that the student has time to write each portion. The student's completed version of the story is then dictated in subsequent administrations for the purposes of charting response to treatment. This approach seems to have promise, as long as a sufficient number of exemplars representing each targeted pattern are included. Limiting the number of targeted patterns to four or five it possible to construct a story of reasonable length. Coupled with the data gathered from inventories, the opportunities for target pattern use in connected writing hold promise for valid measurement of spelling skills.

Recognition

Although recognition is commonly used in formal assessment of spelling, its value has, at the least, been questioned and, at the most, been dismissed altogether. The spelling subtest of the Peabody Individualized Achievement Test-Revised is typical of recognition tasks. It consists of 100 items, which, according to the authors, address basic visual discrimination, phonological awareness, and sound-symbol association. Each of the spelling items contains a correct spelling of the target word along with 3 misspellings. For each item, the examiner reads the target word and uses it in a sentence. The student is instructed to mark the correct spelling, and each item marked correctly increases the raw score by one point. Raw scores are converted into typical derived scores, such as a standard score/quotient, percentile, age equivalency and grade equivalency. Certainly the task of identifying misspelled words is different from formulating spellings. However, proofing is an important component of spelling skills and, whether through standardized identification tests or individualized tasks, the language and literacy specialist will likely want to see how the student responds to correct and incorrect spellings of target forms.

Description of Spelling Skills

Determining that a student's spelling skills are below expected levels and that intervention is needed is only the first part of the assessment process. The data will need to be further analyzed in order to optimally formulate goals for instruction or treatment and establish appropriate baseline information for measuring the effectiveness of intervention. Consequently, the next step in the assessment process is to describe the child's specific spelling skills.

A variety of taxonomies have been used to describe children's spelling. Some of these are more general and based primarily on the linguistic category of the intended form. For example, errors may be designated as occurring on homophones, consonants, vowel errors, inflected words, and reversals. Although this is helpful in quantifying misspellings, this type of analysis may not be as helpful in identifying goals for instruction.

Other systems focus on the forms used by the student, often referred to as invented spellings, to gain insight regarding the student's knowledge of the spelling system. The inventories in Tables 1 and 2 include lists of words that are arranged in order of increasing complexity. Bear and his colleagues provide a check sheet and an error guide that are used to assign each spelling (whether correct or in error) to a specific stage (preliterate, early letter name, letter name, within word pattern, syllable juncture, derivational constancy). For example, for the target word train, the spellings j, t, trn indicate early letter name performance, jran, chran, tan, tran indicate letter name performance, and teran, traen, trane, and train indicate performance at the within-word pattern stage.

A slightly different approach for scoring inventory responses is illustrated in Tables 1 and 2. Orthographic features that are important for the spelling level of interest (i.e., primary or elementary) are identified and then points are assigned for the inclusion of a designated feature in a given word. A total score for each feature is calculated. If a child uses the feature correctly in all of the targets or misses only once, the child is considered to have mastered the feature. If the child uses the feature correctly in some words, yet misses it in two or more other words, that feature is considered an appropriate instructional target. If the child misses the feature in all of the target words, it is considered beyond her instructional level.

The approaches are particularly good as they have the advantage of encouraging the language and literacy specialist to look systematically at the types of spellings the student is using and make a hypothesis as to developmental level on the basis of these spellings. A potential shortcoming of these approaches, however, is the assignment of a student to a single stage or, at least, the transition between two stages. This is sometimes difficult because the data may not fit clearly within one stage. Stage theories may not fully account for the notion that children use multiple strategies and different kinds of knowledge (phonologic, orthographic, morphological) throughout the course of spelling development. Further, it is possible that a skill that appears to be mastered at a lower stage will become problematic again when word complexity increases. For example, representation of each sound with a letter is considered a basic skill and is thought to be mastered during the letter-name stage of development, which is certainly appropriate when considering monosyllabic words. However, as structural complexity increases and the student attempts to spell three- and four-syllable words, s/he may "revert" to a failure to represent every sound with a letter.

Evaluation of Related Abilities

Spelling skills have been linked to a number of other literacy and literacy-related skills, including reading, phonological awareness, and morphological knowledge. Researchers have found strong correlations between spelling and reading, phonemic awareness, and morphological knowledge. Thus, it is wise to obtain data regarding the status of a student's skills in these areas. Such additional assessment of these skills not only provides insight into the student's overall pattern of strengths and weaknesses, but it also can be used later to formulate hypotheses regarding the nature of the specific spelling errors made by the student.

Reading

The ties between reading and spelling have been recognized for some time. As children read, they become exposed to the orthographic patterns and morphological markers that they must replicate in their spellings. Some studies have demonstrated the direct influence reading has on spellings of new words. An assessment of a student's reading abilities, then, will allow the language and literacy specialist to determine a possible co-occurring reading deficit as well as to identify a possible causative or maintaining factor for the spelling deficit.

Reading assessment typically takes the form of both standardized and non-standardized measures. Several standardized reading tests are available. Such tests most often assess a student's ability to (a) identify or recognize familiar words (i.e., sight-word reading), (b) decode or sound out unfamiliar or nonsense words (i.e., phonetic decoding), and (c) comprehend passages of text, either through cloze procedures or by answering factual or inferential questions regarding the text. These tests offer the examiner the ability to determine whether a student is within normal limits, but, like the standardized spelling tests discussed above, these measures provide little insight into the causes for reading difficulty or suggestions for intervention.

Miscue analysis, a non-standardized means to assess reading abilities, requires the language and literacy specialist to record all errors, or miscues, as a student reads aloud from a text. Patterns of errors are identified, such as errors of reversals, semantic substitutions, insertions or deletions of sounds, etc. By examining the types of errors present during reading, the language and literacy specialist may develop a better understanding of other literacy-related skills known to be foundational skills to both spelling and reading that are deficient, including phonemic and morphological awareness.

Phonological Awareness

Phonological awareness is the ability to think about and manipulate the speech sound segments of a language. For some time, phonological awareness, along with a knowledge of letter sound-correspondence, has been shown to be a strong predictor for spelling development. Development of phonological awareness progresses from early awareness of rhymes, alliteration, and sound play in the preschool years to later awareness of the individual sound segments that make up words. It is this latter skill, the ability to segment words into individual phonemes, that seems to best predict students' spelling abilities in children in the early elementary grades. While the relationship between phonological awareness and spelling appears to be reciprocal (i.e., practice with each helps the other), students need some phonological awareness skills to begin to decode words and translate phonemes into graphemes. Thus, segmentation tasks can be used to identify early possible cause and/or maintaining factors for spelling impairments.

There are several standardized measures of phonological awareness available to the language and literacy specialist to assess phonemic awareness skills. Some of these tests focus exclusively on phonemic segmentation skills. Others include a number of different phonological awareness tasks in addition to segmentation tasks, such as phonemic blending and generating words from phonemes. While these tests vary in the ages on which they are normed and their psychometric strength, they nevertheless are means to determine how explicitly a student is able to think about the sound segments of the language.

For students who demonstrate difficulties in segmenting words into phonemes, language and literacy specialists can hypothesize that spelling will be affected. However, phonological awareness is not the only literacy-related skill that affects spelling abilities. Morphological awareness, which relies on a student's phonological, semantic, and syntactic knowledge, also plays a critical role in spelling development.

Morphological Awareness

Morphological awareness involves the ability to be conscious of and manipulate the morphological units of a language. It involves the ability to identify root words and their inflected or derived forms. Awareness of morphological structure plays an important role in spelling. Because many word spellings cannot be explained or written using phonological knowledge, the explicit use of morphological knowledge becomes an increasingly important spelling strategy as students mature.

A strong relationship between morphological knowledge and spelling has been established. Performance on morphological judgment tasks correlate significantly with general measures of spelling. Like phonological awareness, morphological awareness has a reciprocal relationship with spelling. Experiences with spelling lead to greater understanding of the use of certain morphological forms, while an understanding of grammatical morphology leads to better or more accurate spelling.

Although there are standardized tests that can be administered to assess phonological awareness, language and literacy specialists must rely on the spelling literature to construct non-standardized measures of morphological. Several techniques have been used to assess students' morphological knowledge, including spelling lists, cloze procedures, word judgment tasks, and suffix addition tasks. Using spelling lists, researchers have asked young students to spell words that are phonetically similar on some aspect yet morphologically different on another (e.g., words containing two morphemes ending in a consonant cluster, such as tuned, versus words containing one morpheme ending in a consonant cluster, such as brand). In cloze procedure tasks, student hear a word followed by a sentence, and then are asked to complete the sentence with either the derived form or the root form of the word initially presented (e.g., magic, David Copperfield is a __). Students show most success on these tasks when they are given a derived form and are asked to provide the root word. Word judgment tasks require students to determine whether a pair of words represents a root word and either a fake (table-vegetable) or real (teach-teacher) derived form. Students must apply their knowledge of suffixes to nonsense words in suffix addition. These tasks are similar to the familiar wug/wugs task, except students write their responses.

Poor morphological awareness skills may be due to poor reading skills. With decreased or inadequate reading skills, there are fewer opportunities to benefit from repetitive exposures to inflectional and derivational morphology in spelling. In addition, poor morphological awareness skills may result from an overall deficit in general metalinguistic skills. Thus, it is appropriate to assess other metalinguistic skills, including semantic and syntactic awareness, as well as additional language skills that may impact on students' spelling abilities.

Additional Language Skills

Because spelling may be indicative of a more general, although subtle, language problem, it is important to assess other areas of language as well. Semantic and syntactic awareness may be measured using a number of standardized tests. For example, one such test requires students to actively think about word order (sentence combining and word ordering subtests) and the semantic similarities among groups of words (vocabulary and generals subtests). Similarly, another such test contains subtests that assess measure syntactic and semantic awareness skills (e.g., word classes and sentence assembly subtests). Findings from these tests may explain deficits in morphological awareness as well as prove to be important when designing intervention stimuli and activities. The language and literacy specialist must consider whether material will be too challenging or demanding of the child's working memory resources.

Other areas of language, including oral and written narrative discourse, and complex syntactic structures in oral and written language should be assessed to determine possible factors that may increase the demands needed to complete a writing task. If narrative and/or syntactic skills are delayed or deficient, then the working memory demands they place on a writer constructing a text may be great, resulting in a less than optimal level of resources devoted to the task of spelling. Findings such as this will influence the manner in which spelling is facilitated during intervention.

Finally, other factors may influence spelling development, such as cognitive development and the type of formal spelling instruction received in a school setting. Although these factors may have important ramifications, their current status should not have a direct bearing on the method the language and literacy specialist uses for spelling assessment. Consequently, one of ordinary skill in the art is directed elsewhere for pertinent.

BRIEF SUMMARY

The present invention focuses on the description of patterns of errors that are present in spellings. As with most methods of language assessment, the identification of patterns of either correct or incorrect spellings depends upon the collection of adequate data. Administration of a standardized test of spelling and one or more of the qualitative inventories previously described provides a sufficient beginning. Samples of the student's classroom writing also should be collected and added to the database. All of the student's spellings—correct as well as incorrect—should be documented. As these words are analyzed, care should be given to the linguistic and situational contexts (e.g. dictation, connected writing within narratives) from which they are derived. These contexts may affect accuracy and performance, as described below.

The next step is to identify patterns of spelling errors (i.e., mistakes that characterize more than one misspelling) that are present in the student's sample. Familiarity with the components of the English spelling domain (Table 3), as well as with common error patterns (Table 4), helps with initial descriptions. Most of the errors encountered should fit into one of the items on these lists, and any remaining errors can be characterized by descriptive statements developed by the language and literacy specialist. Because the occurrence of many errors can be influenced by word complexity, pattern statements may need to be refined to reflect considerations such as syllabic structure.

The language and literacy specialist should identify three or four patterns that will ultimately become the initial focus of intervention. Selection of these patterns should based on several factors. First, error patterns that operate with a reasonable degree of frequency should be selected. Decisions regarding this reasonable degree are not always straightforward. Certainly, an error that occurs on only a few of the possible opportunities would not be a priority for intervention based on the premise that the pattern will continue to be gradually mastered. On the other hand, when errors operate more frequently the likelihood of eventual acquisition is decreased. No set criterion (i.e., percentage occurrence) for individual error patterns has been used to define the point at which instruction is necessary. Second, less complex patterns (i.e., those that typically develop earlier) should be chosen over more complex ones. Third, target patterns that represent the potential to have a marked effect on the student's writing ability should receive some priority.

Once the language and literacy specialist has identified the error patterns of concern, the next phase of assessment involves developing hypotheses for the nature or cause of each error pattern. The present invention presents a method of performing such an assessment. In addition to the factors that may contribute to spelling development described above (i.e., phonological awareness, morphological knowledge), the language and literacy specialist also must determine a student's orthographic knowledge and visual storage of spellings. Orthographic knowledge ("OK") involves the set of skills necessary to translate language from spoken to written form (i.e., the use of spelling strategies). Abilities in this area range from early selection of the appropriate letters to represent consonant sounds to an understanding of sophisticated orthotactic principles. Examples of such knowledge include an appreciation for the principle that /k/ is spelled with a ck only in the medial or final position of words, never at the beginning. Similarly /tʃ/ is spelled with ch in the initial word position and either tch or ch in the final position, depending upon vowel tenseness.

Visual storage, or visual orthographic images ("VOI"), refers to the representation of images or templates for words, morphemes, and syllables in memory. These templates are called Visual Orthographic Images (VOIs) and they are primarily developed through adequate exposure to print. It is possible that inadequate VOIs are related to the use of a partial-cues reading strategy by children. A partial cues reading strategy occurs when a child reads by selectively sampling parts of the word, usually the beginnings and endings and relies heavily on context to derive a reasonable guess. Use of this strategy may limit the formation of visual images necessary for accurate spelling. Handwriting may also affect the storage of visual orthographic images. Poor handwriting may inhibit the establishment of an adequate lexical representation in memory, which can, in turn, lead to compromised spelling skills. Glenn & Hurley caution that the early use of cursive writing might also make a child vulnerable to spelling problems due to the mismatch between the appearance of cursive and printed text. Given the potential negative contribution of cursive writing, language and literacy specialists may consider collecting data that are printed by the student.

When developing hypotheses about the nature of a student's spelling difficulties, the language and literacy specialist will need to assess the student's phonological and morphological awareness skills, as well as the student's orthographic knowledge and visual storage. By determining which factor(s) may be causing or maintaining the spelling difficulties, the language and literacy specialist can develop specific goals for spelling instruction or intervention.

DETAILED DESCRIPTION

Figure 1:
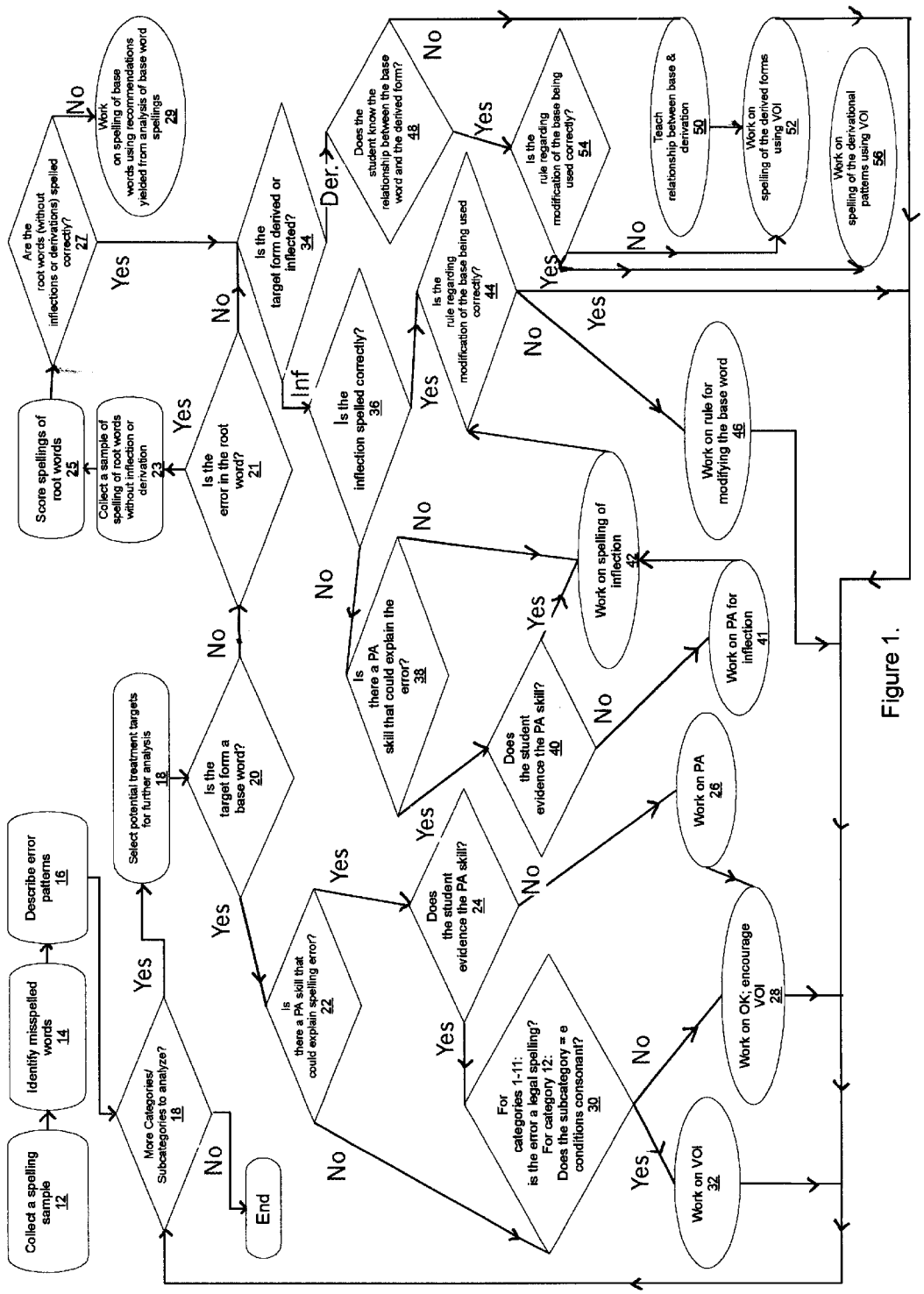
FIG. 1 is a flow diagram of a method of spelling assessment in accordance with a first embodiment of the present invention.

The present invention provides a method 10 for systematically assessing student' spelling error patterns. FIG. 1 shows the method 10 in flowchart form as a series of steps that a language and literacy specialist is to perform to determine the cause(s) of a student's spelling errors. As described below, error patterns dealing with root words (i.e., words that represent a single morpheme, including compound words) are analyzed separately from inflected or derived words (i.e., words that contain or reflect inflectional or derivational morphology). Examples of inflected words include jumped, swims, and hitting; examples of derived words include recycle, health, and magician.

In step 12, a user of the method, or language and literacy specialist, collects spelling samples from the student. Preferably, 50 to 100 words are collected per student. In step 14, the language and literacy specialist identifies any and all of the words that are misspelled. In step 16, the language and literacy specialist describes error patterns present in the misspelled words according to category (e.g., short vowel) and subcategory (e.g., /æ/) of the target letters that are affected by the misspelling. In step 18, the language and literacy specialist selects potential treatment targets to further analyze for the purpose of identifying cause(s) and making recommendations for treatment based on the error patterns identified in step 16. In step 20, the language and literacy specialist determines whether, for a given identified pattern, the target form is a base word.

Having found in step 20 an error pattern that occurs in the spelling of words in which the target form is a base word, in step 22 the language and literacy specialist determines whether a phonological awareness skill exists that distinguishes the specific type of error (e.g., omission, substitution, addition) from the correct spelling and could be the cause of the incorrect spelling. For example, a deficit in phonological awareness of phoneme segmentation could account for omission of a consonant from the spelling of a word. As another example, a deficit in phoneme identification (e.g., /I/ vs. /ɛ/ or /3/ vs. /3ʳ/) could account for substitution of one vowel for another in the spelling of a word. If such a skill exists, the language and literacy specialist identifies the phonological awareness skill needed for correct spelling and, in step 24, searches the sample for correct spellings that provide evidence that the child can use that particular phonological awareness skill. For example, if a student omits one of the consonants in consonant clusters with a reasonable degree of frequency (e.g., bad for band), then the language and literacy specialist would search the sample for words containing consonant clusters spelled correctly. If the search results in a number of examples of consonant clusters correctly spelled, then the language and literacy specialist can assume that the student has the necessary phonological awareness skill (e.g., in this case the student can identify the difference between words containing nasal+stop clusters versus those containing only nasal or stop singletons) and begin assessing orthographic knowledge (see below). Alternatively, or if there is not enough evidence from the spelling sample to suggest that a student has the necessary phonological awareness skill, then the language and literacy specialist will need to examine the results of a standardized test of phonological awareness or develop and administer specific, non-standardized tasks (segmenting, sorting, or identification tasks) that measure the phonological awareness skill in question. Continuing with the previous example, if the language and literacy specialist does not find a sufficient number of correctly spelled consonant clusters, then s/he can examine the results of a segmenting task on a standardized measure (e.g., PAT) to determine whether the student correctly segmented words containing consonant clusters. Alternatively, or if there are not enough opportunities to observe the target segmenting skill on the standardized test, the language and literacy specialist can develop a list of words containing the target pattern and require the student to segment these words. If the evidence from these tasks suggests poor phonological awareness skills for the spelling pattern in question, then it is likely that the student does not have the necessary phonological awareness skill and, in step 26, the language and literacy specialist focuses on improving that skill in the student before focusing on orthographic knowledge and visual storage in the student in step 28 (see below).

Orthographic Knowledge and Visual Storage

If the cause of an error pattern does not appear to be due to poor phonological awareness skills, as determined in step 22 or in step 24, then, in step 30, the language and literacy specialist determines whether the misspelling represents an allowable spelling in the English language. Judgments about allowable spellings must take into account positional constraints. For example, while mach may appear to be an allowable spelling for match, positional constraints of English dictate that the tch is typically used in the final position following a short vowel. Thus, to fully determine which misspelled words are allowable spellings, the language and literacy specialist must be well informed of orthographic rules that include positional constraints.

If the language and literacy specialist determines that the error pattern represents an allowable spelling (e.g., peech for peach because /i/ is often spelled with the digraph ee), then, in step 32, the language and literacy specialist focuses on increasing the student's visual storage for words containing this pattern. However, if the error violates an allowable spelling (e.g., ckat for cat), then, in step 28, the language and literacy specialist focuses on developing orthographic knowledge in the student for the specific spelling patterns, including information about positional constraints, as well as working on visual storage. In either case, after step 28 or after step 32, the assessment is complete and the language and literacy specialist returns to step 18 and selects another potential treatment target for analysis.

In steps 22–32, as described above, error patterns occurring in base words are analyzed to determine the appropriate course(s) of intervention. However, errors patterns may alternatively occur in words that are derivations of root words and/or contain inflectional markers. For these error patterns (the "no" branch of step 20), a different set of steps to determine possible cause(s) for the error patterns is followed, as described below.

Inflected or Derived Words with Errors in the Root Words

In step 21, the language and literacy specialist determines whether the error in the derived word or inflected word is actually in the root form of the word. For instance, if "stopping" is the misspelled word, then in step 21 the language and literacy specialist determines whether the root portion of the word, or "stop," is misspelled.

If the root form is not misspelled, then, in step 34, the language and literacy specialist determines whether the misspelled word is derived or inflected, and proceeds accordingly as described below. However, if the root portion of the word is misspelled, then the language and literacy specialist must determine how the student spells the root word in the absence of any inflection or derivation. The language and literacy specialist collects samples of root words (step 23), scores them (step 25), and determines whether the student spelled these newly-collected root word samples correctly according to a set criterion, for example greater than 50% (step 27). If the student spelled the newly-collected root word samples correctly according to the criterion, then, in step 34, the language and literacy specialist determines whether the original target form was derived or inflected, and proceeds accordingly as described below. However, if the student failed to meet the criterion for spelling the newly-collected root word samples correctly (step 27), the language and literacy specialist will recommend working on correcting spelling of error patterns in base words using the results previously yielded from Steps 22–32 before teaching spelling of derived or inflected forms (step 29). The language and literacy specialist will then return to step 18 for analysis of another category/subcategory.

Inflections and Derivations Defined

Inflectional morphemes provide additional information about time (e.g., "-ed", "-ing") or quantity (e.g., plural "-s') without changing the meaning or class of the word. Derivational morphemes, which can be prefixes (e.g., "un-", "re-") or suffixes (e.g., "-tion", "-er"), change the meaning and/or the word class (e.g., teach-teacher, friend-friendly, admire-admiration). In some cases, these derivational forms do not affect the root word (e.g., teach-teacher); in others, they alter the root word orthographically (e.g., happy-happiness) or phonologically (e.g., magic-magician). Typically, with these modifications, the semantic link between the root word and the derived word is clear, or transparent. However, derivations also can alter both the phonological and orthographic properties of the root word (e.g., heal-health, sign-signal). These opaque forms may offer less clear semantic connections between the root and derived forms, and, consequently, be more difficult to spell.

Because the error patterns for the inflectional and derivational aspects of morphology differ, separate steps are used to analyze the respective error patterns. In step 34, the language and literacy specialist determines whether the error is in a target form that is derived or inflected. When an error pattern involves both inflections and derivations (e.g., recycled), the language and literacy specialist will need to decide whether one or both series of steps should be followed.

Inflected Word Patterns

When an error pattern is noted on words containing morphological inflections (step 34), in step 36 the language and literacy specialist determines whether the error is a misspelling of the inflected form itself or whether the error involves only the rule governing the modification of the base word. For example, some students may represent the past tense marker solely by spelling the associated sound /d/ or /t/ (e.g., jumpt for jumped). In this case, the inflection is not spelled correctly, and in step 38 the language and literacy specialist determines whether there is a phonological awareness skill that could explain the error. If such a skill does not exist, then, in step 42, the language and literacy specialist works on the spelling of the inflection. However, if such a phonological awareness skill does exist, then, following step 38, the language and literacy specialist determines in step 40 whether the student has demonstrated the particular phonological awareness skill. If the student has demonstrated the particular phonological awareness skill, then, in step 42, the language and literacy specialist works on the spelling of the inflection. However, if the student has not demonstrated the particular phonological awareness skill (step 40), then, in step 41, the language and literacy specialist would establish a goal to develop the appropriate phonological awareness skill in the student and then return to Step 18 to select another potential treatment target for follow-up.

In some cases, allowable or non-allowable error patterns may be due to an overgeneralization of an inflectional morphological rule. For example, students will overgeneralize the use of inflected markers to words that are irregular in the use of that rule (e.g., raned for ran) or to words that contain the same final phoneme as the inflected form (e.g., spelling soft as sofed, because of its phonological similarity to coughed). In these cases, the language and literacy specialist may decide to increase a student's awareness of the general inflectional system in intervention, rather than target orthographic knowledge or visual storage in Step 42.

Following working on spelling of the inflection in step 42, the language and literacy specialist then determines in step 44 whether the rule regarding modification of the base word was being used correctly. If the rule was being used correctly (e.g., hoping for /hopɪŋ/), the evaluation is complete and the language and literacy specialist returns to step 18 and selects another potential treatment target for follow up. However, if the rule was not being used correctly, then in step 46 the language and literacy specialist will recommend working on the rule for modifying the base word. For example, if the error pattern involved a lack of doubling consonants when adding a suffix to consonant-vowel-consonant root words (e.g., stoping for stopping), the language and literacy specialist would establish a goal to facilitate the use of the doubling rule. After step 46, the assessment is complete and the language and literacy specialist returns to step 18 and selects another potential treatment target for follow up.

If the inflection is being spelled correctly (step 36), then, in step 44, the language and literacy specialist determines whether the rule regarding modification of the base is being used correctly, and proceeds as described above.

Derived Forms

When a series of misspelled words representing derived forms is identified in step 34, then, in step 48, the language and literacy specialist determines the student's awareness of the relationship between the root words and their derivations. This is accomplished in two ways. First, a search of the spelling sample may yield examples of the specific or similar root words and their derivations. Comparison of the student's ability to correctly spell the root words versus the derived forms provides insight as to whether the student is using the knowledge of the root to spell the derivative form. If the sample does not contain examples of the root words and derivations, a cloze procedure can be used to determine the student's morphological awareness for derived forms. Alternatively, additional spelling samples could be collected to assess the student's spelling of the base word without the derivation.

Certain derivational error patterns may be more easily identified than others and apply across a variety of words and word classes. These error patterns typically involve derivations that either do not alter the root word, or alter it minimally (i.e., phonological or orthographic changes). These more transparent changes allow the language and literacy specialist to identify and assess knowledge of derivational morphology using a variety of words and word classes that involve the application of the derivational pattern. Examples of these derived forms include words containing prefixes such as "un-", "re-", and "in-" and suffixes such as "-ly", "-tion" and "-ness". However, opaque derived forms (those that involve phonological and orthographic changes to the root word) may be less likely to be identified as patterns, simply because these errors apply to a smaller corpus of words. A good example is the relationship between health and heal. Spelling the word health as helth seems quite reasonable without the recognition of the relationship between the two words. Thus, what may seem like a random number of misspelled words may in fact be a series of words that are opaque derived forms. In this case, the language and literacy specialist may use morphological awareness tasks to assess and subsequently increase the student's knowledge of roots and their derived forms (step 46).

If the student fails to recognize and use the relationship between the root and derived form to spell such words, then, in step 50, the language and literacy specialist focuses on instilling in the student morphological awareness skills, i.e. the relationship between base and derivation, followed by working on the student's spelling of the derivative form in step 52.

If the student demonstrates awareness of the relationship between the root word and the derivation in Step 48, the language and literacy specialist bypasses step 50 and, in step 54, determines whether the rule regarding modification of the base is being used correctly. If the rule is being used correctly, then, in step 56, the language and literacy specialist focusing on strengthening the student's spelling of the derivational pattern (e.g., "ment"); however, if the rule is not being used correctly, then, in step 52, the language and literacy specialist works on the student's spelling of the derivational form (e.g., "argument"). However, the ability to use morphological knowledge to spell derivatives in structured tasks may indicate that tasks are occurring during spontaneous writing that are competing for the student's memory resources (e.g., demands of handwriting, complex syntactic structures). The language and literacy specialist will need to consider this possibility when selecting goals for intervention and may wish to include a comparison of structured and spontaneous writing tasks in Step 48.

After either step 52 or step 56 is used, the assessment is complete, and the language and literacy specialist returns to step 18 and selects another potential treatment target for follow up.

Some of the steps described above with reference to FIG. 1 will now be described in more detail, with reference to FIGS. 2–18.

Figure 2:
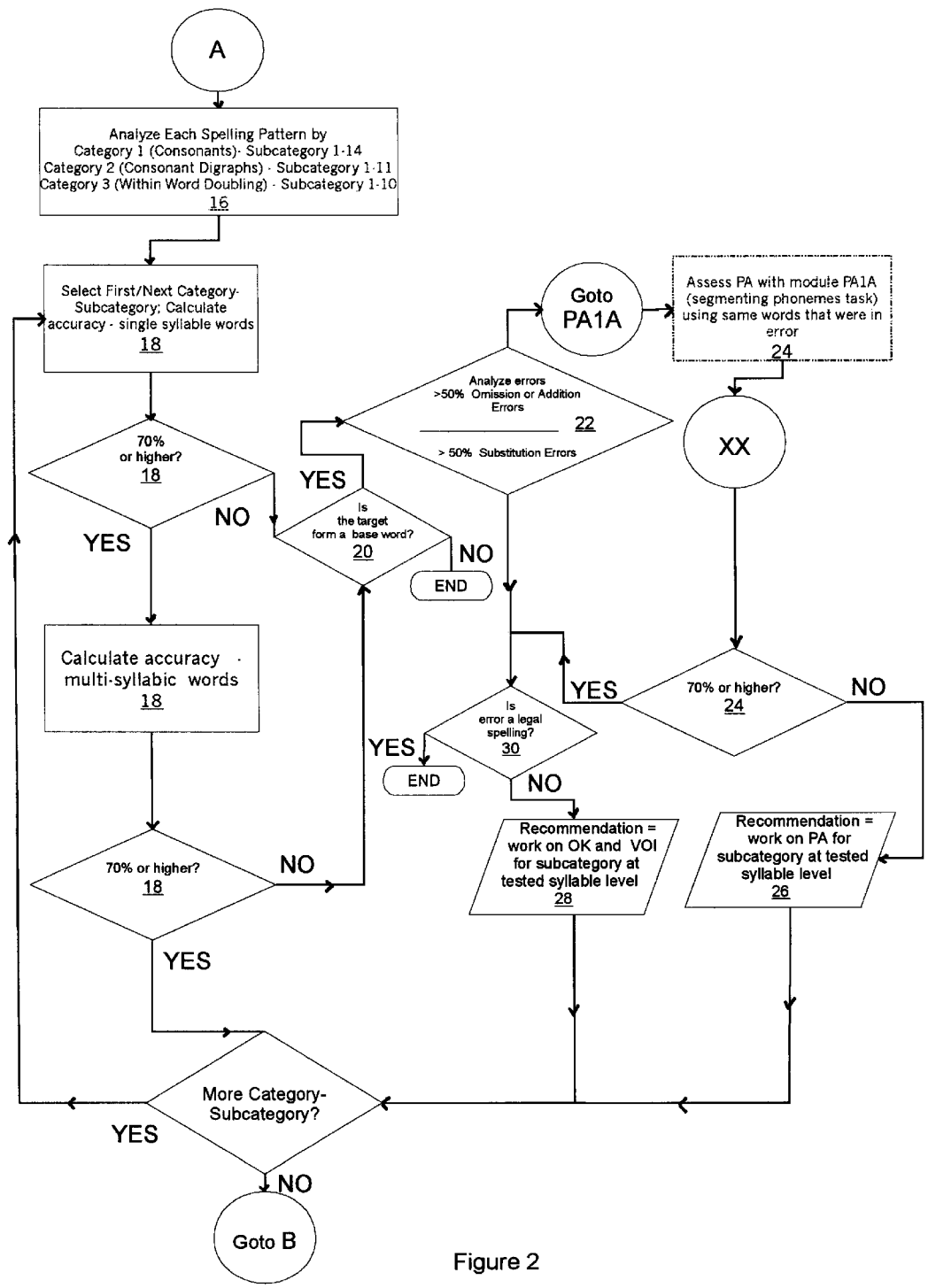
FIG. 2 is a flow diagram in accordance with the method of FIG. 1 for spelling Categories 1–3.
Figure 3:
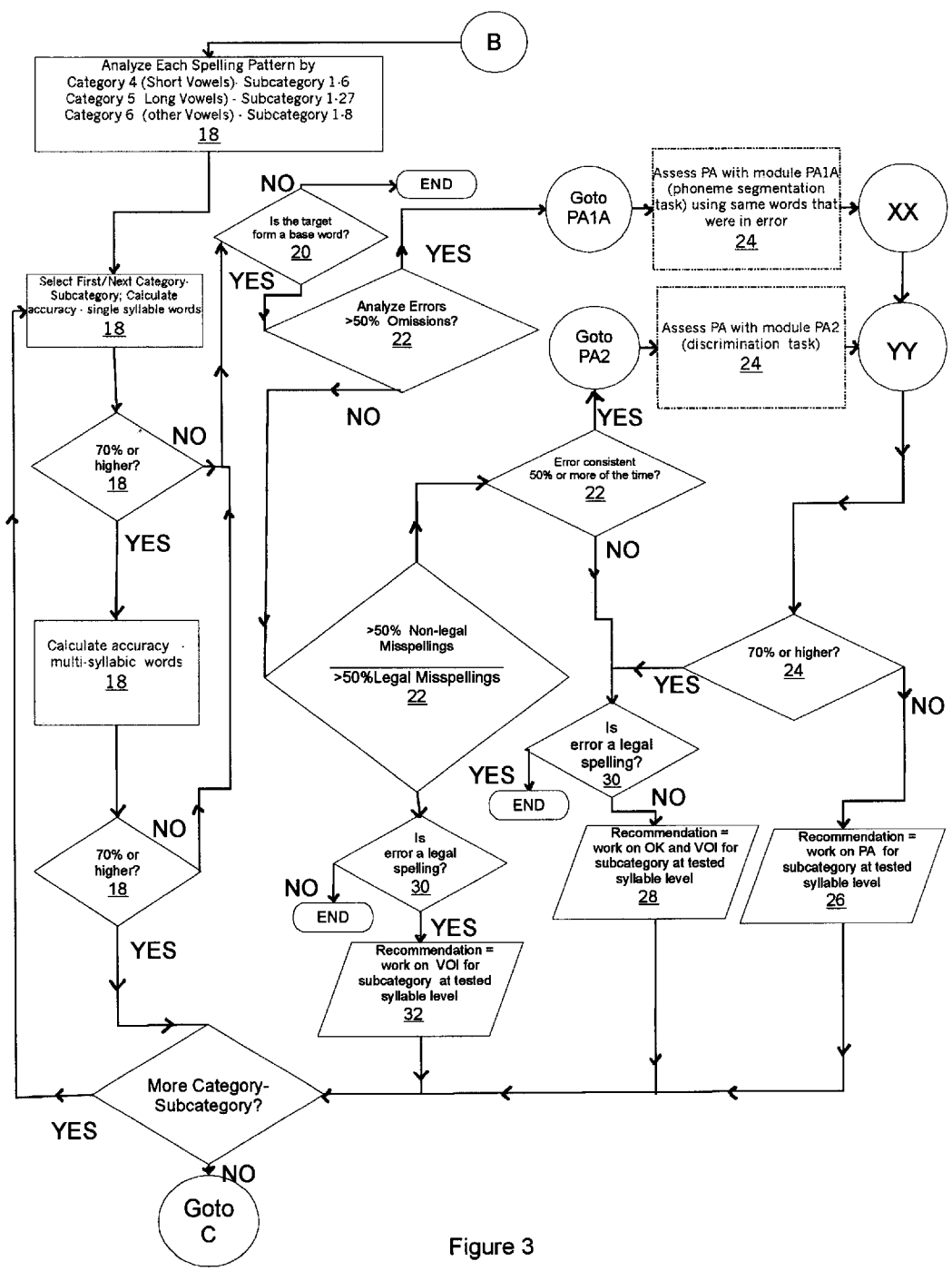
FIG. 3 is a flow diagram in accordance with the method of FIG. 1 for spelling Categories 4–6.
Figure 4:
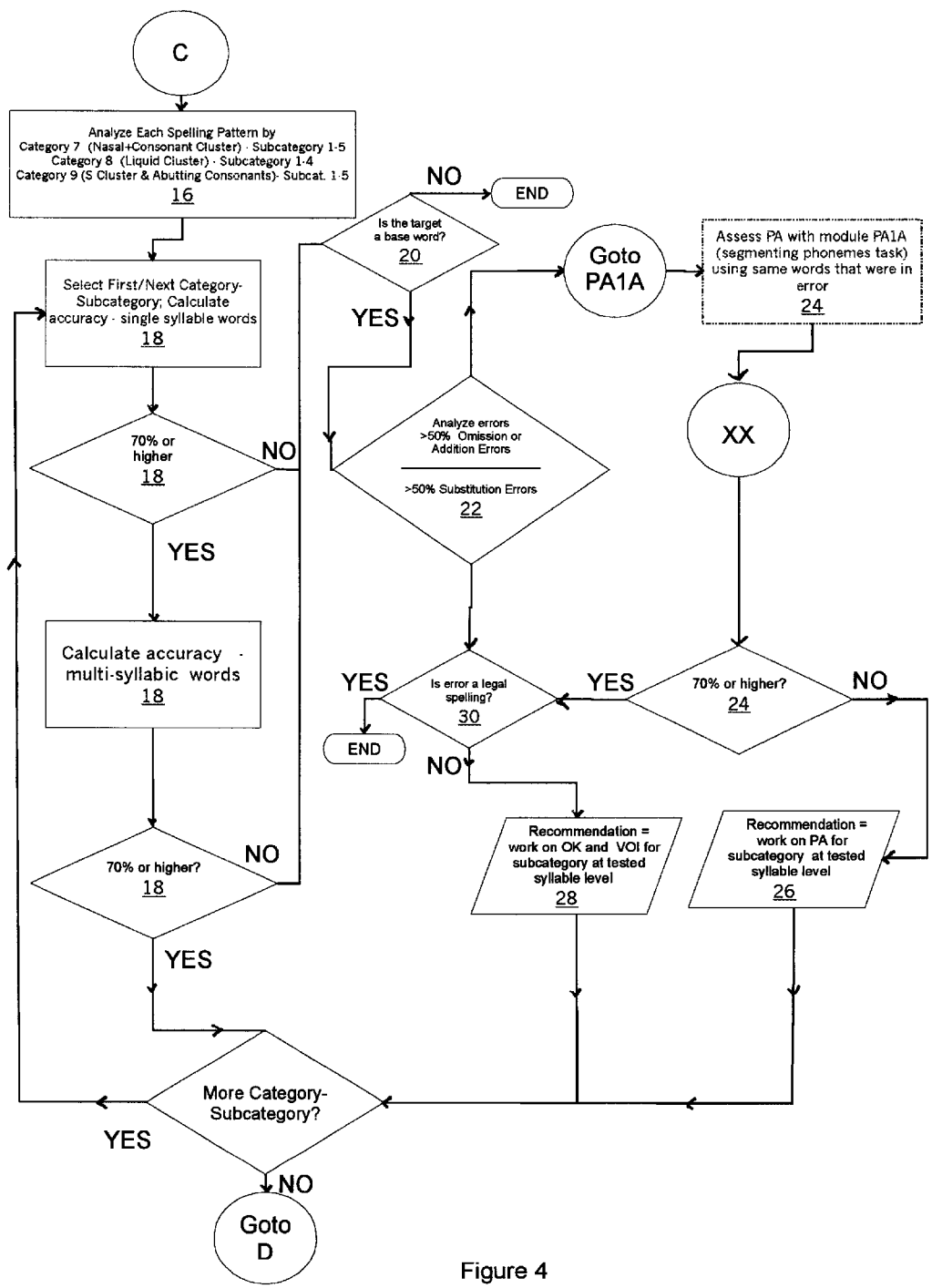
FIG. 4 is a flow diagram in accordance with the method of FIG. 1 for spelling Categories 7–9.
Figure 5:
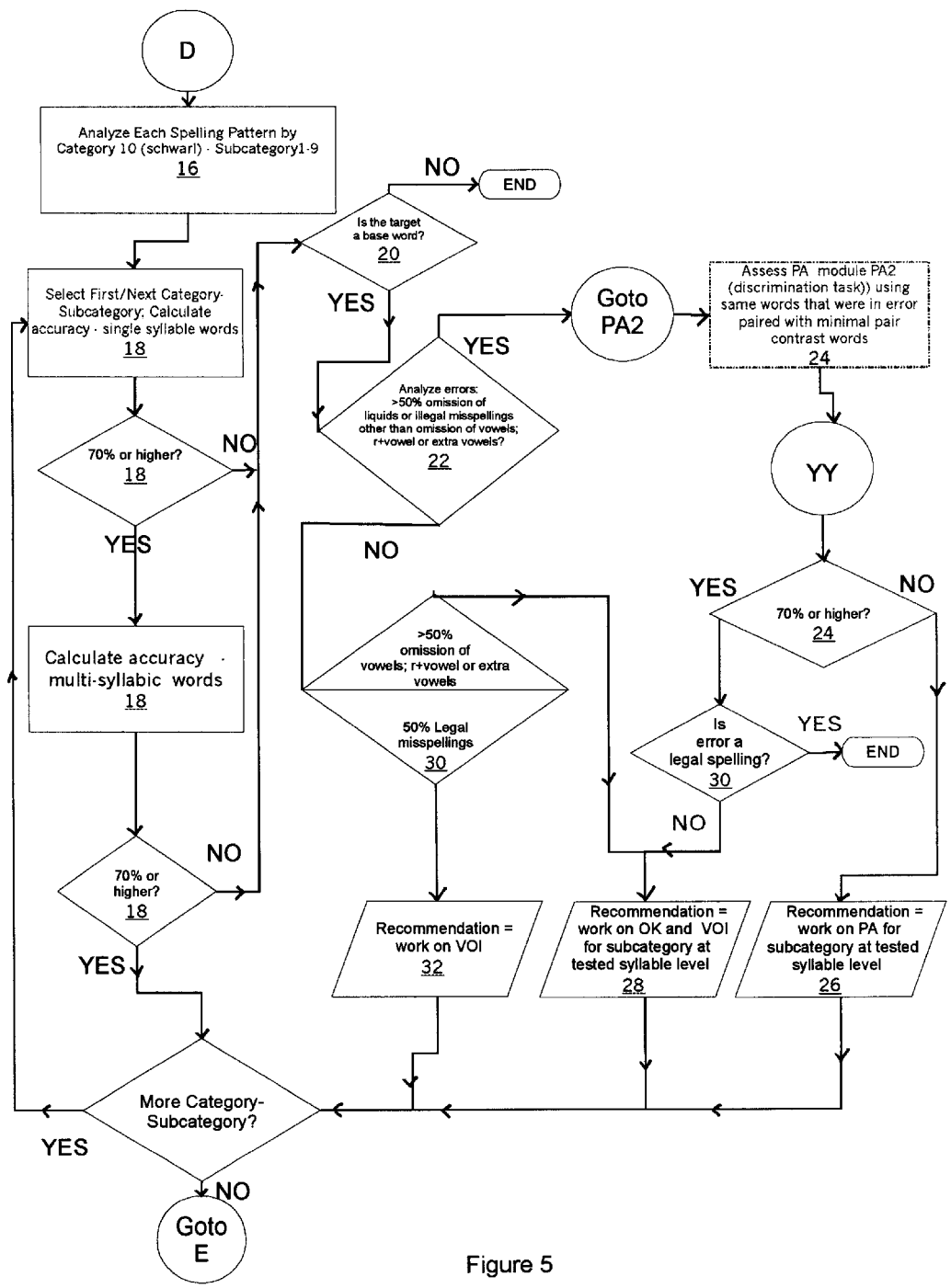
FIG. 5 is a flow diagram in accordance with the method of FIG. 1 for spelling Category 10.
Figure 6:
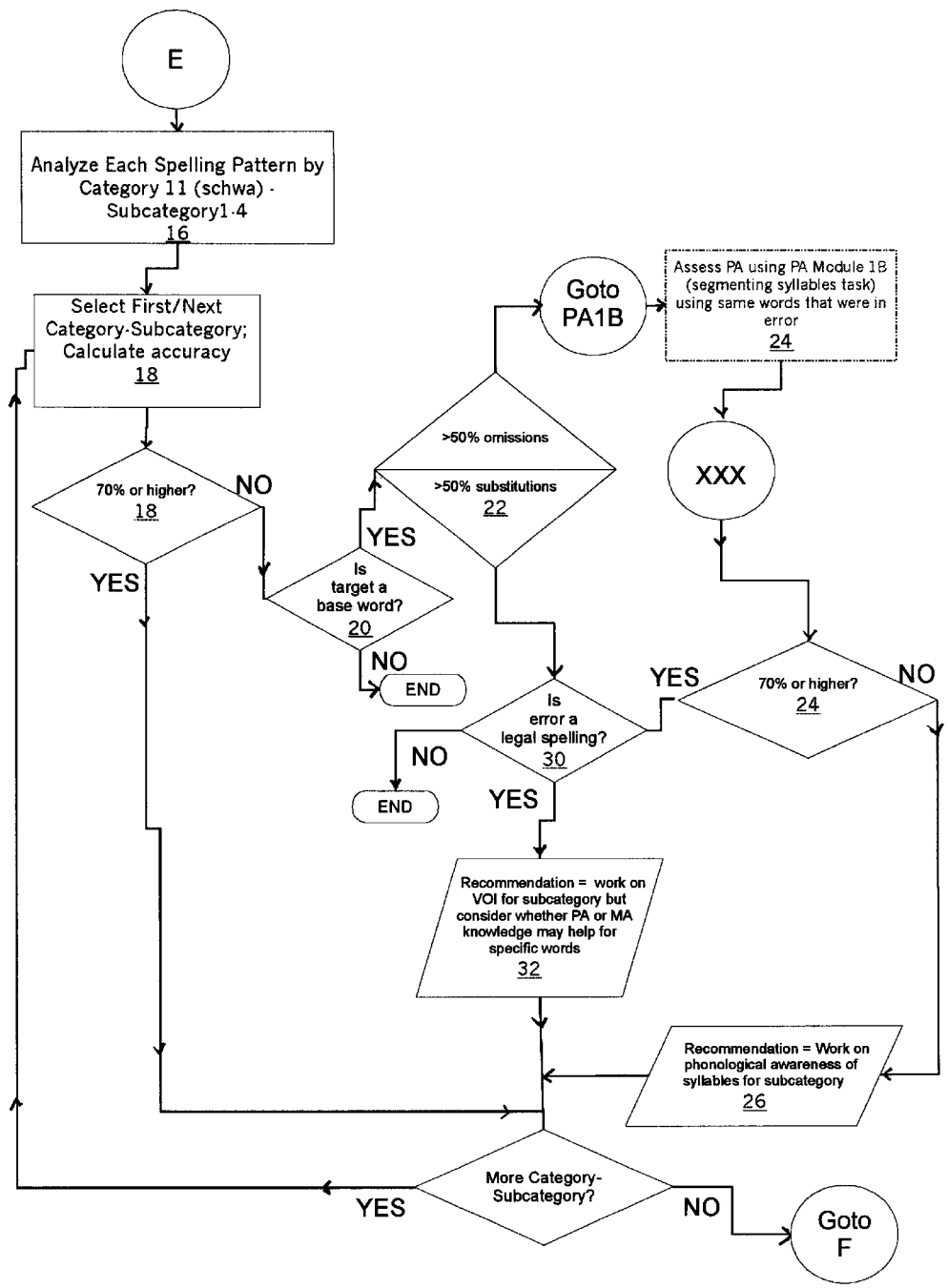
FIG. 6 is a flow diagram in accordance with the method of FIG. 1 for spelling Category 11.
Figure 7:
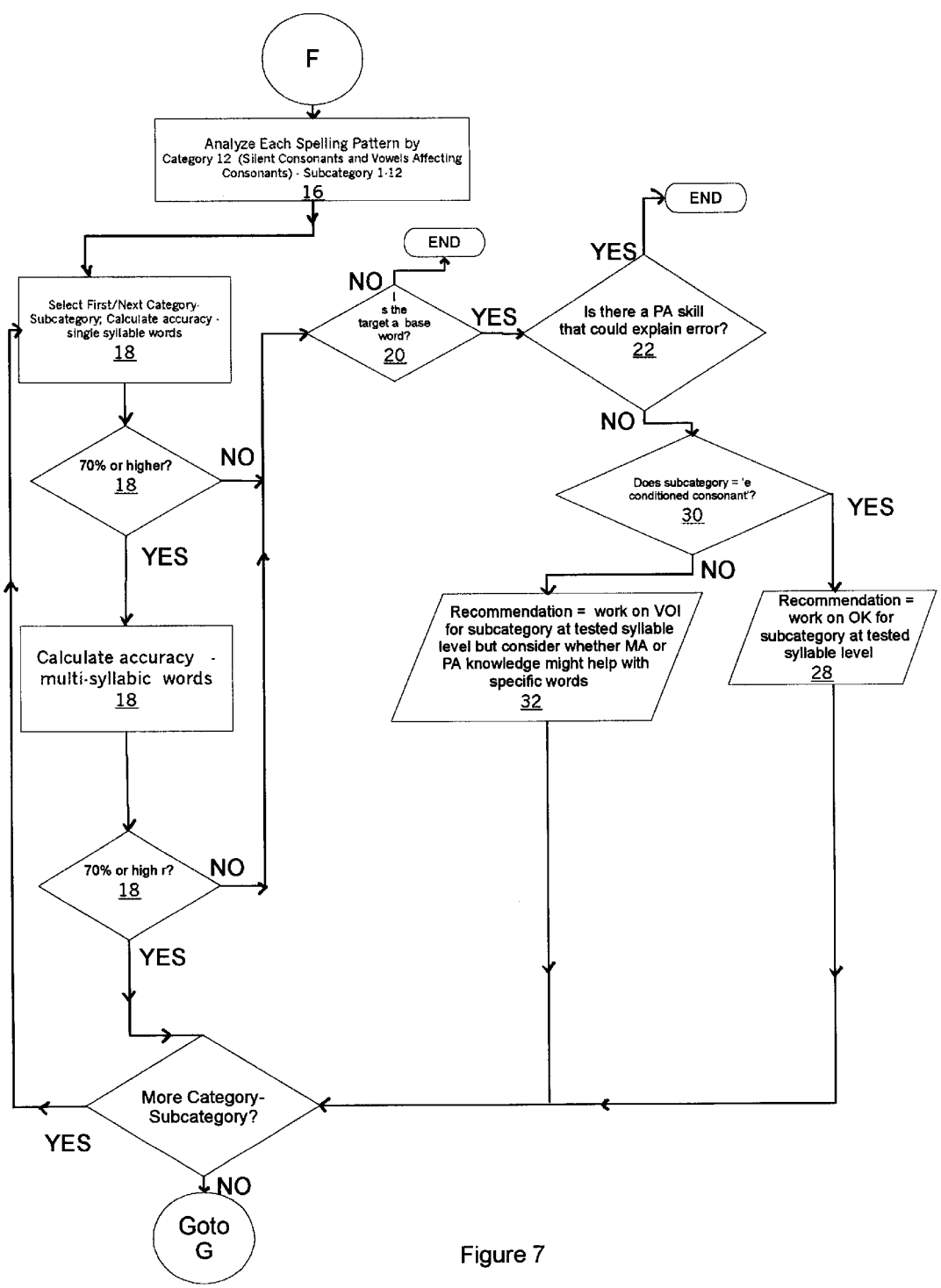
FIG. 7 is a flow diagram in accordance with the method of FIG. 1 for spelling Category 12.
Figure 8:
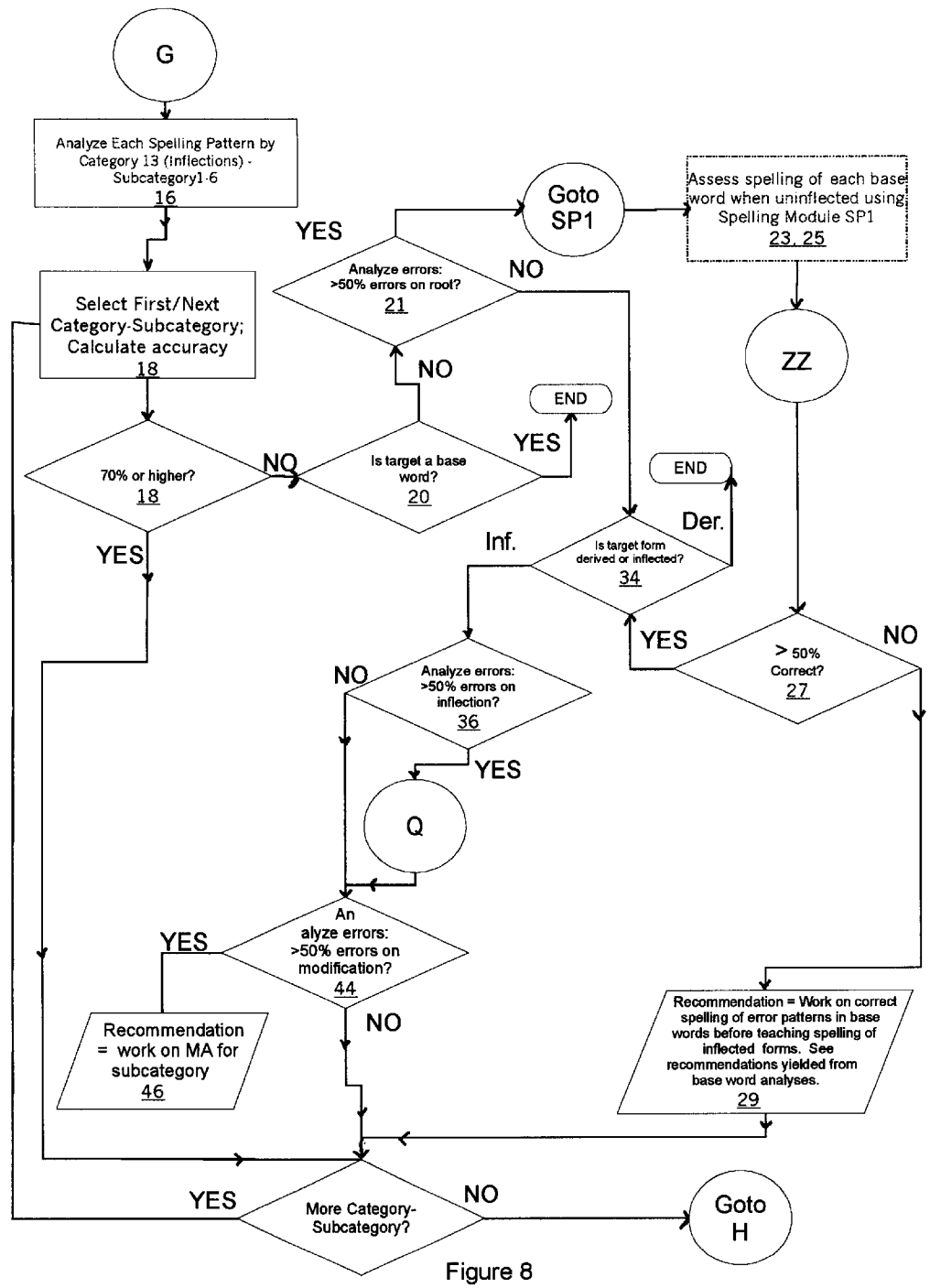
FIGS. 8 and 9 are flow diagrams in accordance with the method of FIG. 1 for spelling Category 13.
Figure 9:
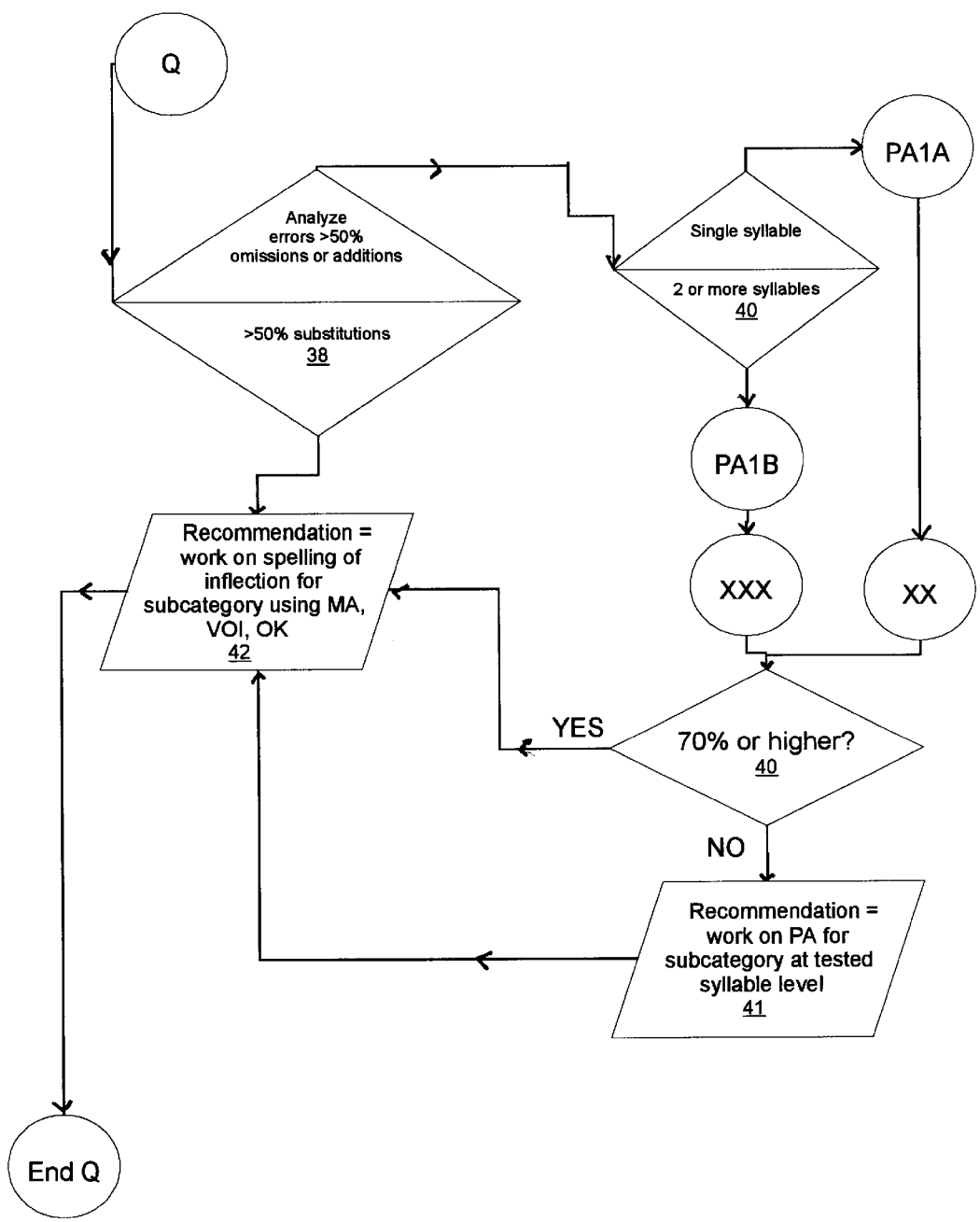
Figure 10:
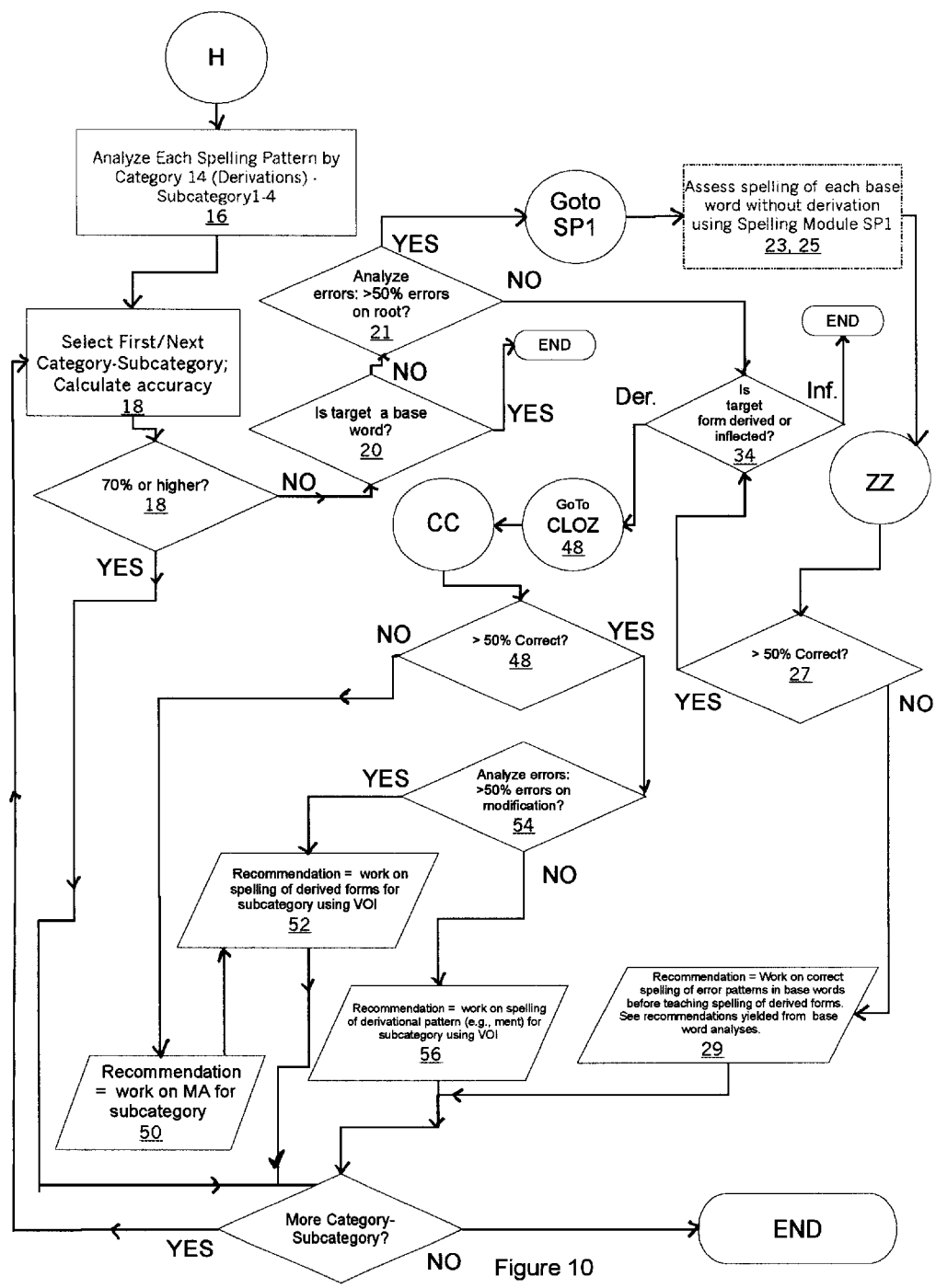
FIG. 10 is a flow diagram in accordance with the method of FIG. 1 for spelling Category 14.

As shown in FIGS. 2–10, in step 16 the language and literacy specialist analyzes each spelling pattern by categories and subcategories (see Table 5) and by specific type of misspelling (see Tables 6–13). Categories 1–3 (Consonants, Digraphs, and Within-Word Doubling, respectively; see Table 6) are analyzed as shown in FIG. 2; Categories 4–6 (Short Vowels, Long Vowels, and Other Vowels, respectively; see Table 7) are analyzed as shown in FIG. 3; Categories 7–9 (Nasal+Consonant Clusters, Liquid Clusters, and S-S Clusters & Abutting Consonants, respectively; see Table 8) are analyzed as shown in FIG. 4; Category 10 (Schwarl; see Table 9) is analyzed as shown in FIG. 5; Category 11 (Cchwa; see Table 10) is analyzed as shown in FIG. 6; Category 12 (Silent Consonants and Vowels Affecting Consonants; see Table 11) is analyzed as shown in FIG. 7; Category 13 (Inflected Words; see Table 12) is analyzed as shown in FIGS. 8 and 9; and Category 14 (Derivatives; see Table 13) is analyzed as shown in FIG. 10.

As shown in FIGS. 2–10, step 18 is an iterative process, with the various elements of step 18 being performed for each subcategory of each category. For each category/subcategory in Categories 1–10 and 12 (FIGS. 2–5 and 7), the language and literacy specialist calculates the student's accuracy in that category/subcategory with single-syllable words. If the student scores at or above a set criterion level, 70% or higher for example in the preferred embodiment, the language and literacy specialist tests the student's accuracy in the same category/subcategory with multi-syllabic words. If the student again scores at or above the set criterion level, 70% or higher in the preferred embodiment, the language and literacy specialist moves on to test the student's proficiency in the next category/subcategory. If the student scores less than the criterion level in the category/subcategory for either single-syllable or multi-syllabic words, the language and literacy specialist proceeds to step 22, as the answer to the question in step 20 ("Is the target form a the base word?") will always be "yes" for these categories with these results.

For Categories 1–3 (FIG. 2), in step 22 the language and literacy specialist determines whether there were mostly (more than 50% in the preferred embodiment) omission or addition errors, or whether there were mostly (e.g., more than 50%) substitution errors. (These are the only choices at this point.) If there were mostly omission or addition errors, then, in step 24, the language and literacy specialist assesses the student's phoneme-segmentation-type phonological awareness skills using the target words that were misspelled. This is described further below, with reference to FIG. 11.

After assessing phonological awareness, then, still in step 24, the language and literacy specialist scores the student on the relevant phonological awareness skill. If the student scores at least at a set criterion level (70% in the preferred embodiment), then, in step 30, the language and literacy specialist determines whether the error is a legal spelling. (A "legal spelling error" is defined as one in which the misspelling is composed of letter(s) that commonly represent the misspelled phoneme in a similar context. For example, spelling "gym" as "gim" is considered a legal misspelling because the letter "i" is commonly used to spell the short vowel 'i' sound in one-syllable words, like "pin.") At this point in the method, the error will surely not be a legal spelling; in that case, the language and literacy specialist, in step 28, recommends working on orthographic knowledge and visual storage. The language and literacy specialist then returns to step 18 and tests another category/subcategory.

If, however, the student scores less than the criterion level (e.g., 70%) on phonological awareness (step 24), then, in step 26, the language and literacy specialist recommends working on phonological awareness skills for the subcategory at the tested syllable level, then returns to step 18 and tests another category/subcategory.

For Categories 4–6 (FIG. 3), in step 22 the language and literacy specialist determines whether there were mostly (e.g., more than 50% in the preferred embodiment) omission errors. If there were mostly such errors, then, in step 24, the language and literacy specialist assesses the student's phoneme-segmentation-type phonological awareness skills using the target words that were misspelled. This is described further below, with reference to FIG. 11.

If there were not mostly omission errors (step 22), then, still in step 22, the language and literacy specialist determines whether there were more than 50% non-legal misspellings or more than 50% legal misspellings. (These are of course the only choices.) If there were more than 50% non-legal misspellings, then, still in step 22, the language and literacy specialist determines whether the error is consistent at some criterion level (e.g., at least 50% of the time in the preferred embodiment). If the error is consistent at the criterion level, the language and literacy specialist assesses discrimination-type phonological awareness in step 24. This is described further below, with reference to FIG. 13.

After assessing phonological awareness, then, still in step 24, the language and literacy specialist scores the student on the relevant phonological awareness skill. If the student scores at or above a set criterion level (e.g., at least 70% in the preferred embodiment), then, in step 30, the language and literacy specialist proceeds through step 30 to step 28; recommends working on orthographic knowledge and visual storage for the subcategory at the tested syllable level; and returns to step 18 to test another category/subcategory. If, however, the student scores less than the criterion level (e.g., 70% in the preferred embodiment) (step 24), then, in step 26, the language and literacy specialist recommends working on phonological awareness skills for the subcategory at the tested syllable level, then returns to step 18 and tests another category/subcategory.

If, however, the error was not consistent at least 50% of the time, or if there were more than 50% legal misspellings (both determined in step 22), then, in step 30, the language and literacy specialist determines whether the error was a legal spelling. Depending on how one got to step 30, the answer to the question is of course predetermined; if there were more than 50% legal misspellings, then the error was a legal spelling, and, in step 32, the language and literacy specialist will recommend working on visual storage for the subcategory at the tested syllable level. If, however, there were more than 50% non-legal spellings, then the error was not a legal spelling and, in step 28, the language and literacy specialist will recommend working on orthographic knowledge as well as visual storage for the subcategory at the tested syllable level. In either case, i.e. after step 32 or step 28, the language and literacy specialist will then return to step 18 and test the next category/subcategory.

For Categories 7–9 (FIG. 4), in step 22 the language and literacy specialist determines whether there were mostly (e.g., more than 50% in the preferred embodiment) omission or addition errors, or whether there were mostly (e.g., more than 50% in the preferred embodiment) substitution errors. If there were mostly omission or addition errors, then, in step 24, the language and literacy specialist assesses phoneme-segmentation-type phonological awareness using the target words that were misspelled. This is described further below, with reference to FIG. 11.

After assessing phonological awareness, then, still in step 24, the language and literacy specialist tests the student on the relevant phonological awareness skill. If the student scores at or above some set criterion level (e.g., 70% in the preferred embodiment), then, in step 30, the language and literacy specialist determines whether the error is a legal spelling. At this point in the method, the error will surely not be a legal spelling; in that case, the language and literacy specialist, in step 28, recommends working on orthographic knowledge and visual storage for the subcategory at the tested syllable level. The language and literacy specialist then returns to step 18 and tests another category/subcategory.

If, however, the student scores less than the criterion level (e.g., 70%) on phonological awareness (step 24), then, in step 26, the language and literacy specialist recommends working on phonological awareness skills for the subcategory tested at the syllable level, then returns to step 18 and tests another category/subcategory.

For Category 10 (FIG. 5), in step 22 the language and literacy specialist determines whether there were mostly (e.g., more than 50% in the preferred embodiment) omissions of liquids or illegal misspellings other than omissions of vowels, r-vowels or extra vowels. If there were mostly of such errors, then, in step 24, the language and literacy specialist assesses discrimination-type phonological awareness using the target words that were misspelled paired with minimal pair contrast words. This is described further below, with reference to FIG. 13.

After assessing phonological awareness, then, still in step 24, the language and literacy specialist scores the student on the relevant phonological awareness skill. If the student scores at or above a set criterion level (e.g., 70% in the preferred embodiment), then, in step 30, the language and literacy specialist determines whether the error is a legal spelling. At this point in the method, the error will surely not be a legal spelling; in that case, the language and literacy specialist, in step 28, recommends working on orthographic knowledge and visual storage for the subcategory at the tested syllable level. The language and literacy specialist then returns to step 18 and tests another category/subcategory.

If, however, the student scores less than the criterion level on phonological awareness (step 24), then, in step 26, the language and literacy specialist recommends working on phonological awareness skills for the subcategory tested at the syllable level, then returns to step 18 and tests another category/subcategory.

If the analysis in step 22 revealed no more than 50% of the types of errors tested for, then, in step 30, the language and literacy specialist determines whether there were more than 50% omissions of vowels, r-vowels, or extra vowels, or whether there were more than 50% legal misspellings. (These are the only choices at this point.) If there were more than 50% omissions of vowels, r-vowels, or extra vowels, then, in step 28, the language and literacy specialist recommends working on orthographic knowledge and visual storage for the subcategory at the tested syllable level. The language and literacy specialist then returns to step 18 and tests another category/subcategory. If, however, there were more than 50% legal misspellings, then, in step 32, the language and literacy specialist recommends working on visual storage for the subcategory at the tested syllable level, and then returns to step 18 to test another category/subcategory.

As shown in FIG. 6, single- and multi-syllable words are not tested separately in step 18 for Category 11. For Category 11, in step 18 the language and literacy specialist calculates the student's accuracy for all words in the entire category/subcategory. If the student scores at or above a set criterion level (e.g., 70% in the preferred embodiment), the language and literacy specialist moves on to test the student's proficiency in the next category/subcategory. If the student scores less than the criterion level in the category/subcategory, the language and literacy specialist proceeds to step 22, as the answer to the question in step 20 ("Is the target a base word?") will always be "yes" for this category with these results.

In step 22 the language and literacy specialist determines whether there were mostly (e.g., more than 50% in the preferred embodiment) omissions or mostly (e.g., more than 50% in the preferred embodiment) substitutions. (These are the only choices at this point.) If there were mostly omissions, then, in step 24, the language and literacy specialist assesses segmenting-syllable-type phonological awareness using the target words that were misspelled. This is described further below, with reference to FIG. 12.

After assessing phonological awareness, then, still in step 24, the language and literacy specialist scores the student on the relevant phonological awareness skill. If the student scores at or above a set criterion level (e.g., 70% in the preferred embodiment), then, in step 30, the language and literacy specialist determines whether the error is a legal spelling. At this point in the method, the error will surely not be a legal spelling. The language and literacy specialist then returns to step 18 and tests another category/subcategory.

If, however, the student scores less than the criterion level on phonological awareness (step 24), then, in step 26, the language and literacy specialist recommends working on phonological awareness skills for the subcategory tested at the syllable level, then returns to step 18 and tests another category/subcategory.

If in step 22 the language and literacy specialist determines there were mostly (e.g., more than 50% in the preferred embodiment) substitutions, then in step 30 the language and literacy specialist determines if the error is a legal spelling. At this point in the method, i.e., arriving at step 30 directly from step 22, all errors will surely be legal; in this case the language and literacy specialist, in step 32, recommends working on visual storage, and also considers whether phonological awareness skills or morphological awareness skills might help for specific words.

As shown in FIG. 7, single- and multi-syllable words are again tested separately in step 18 for Category 12, as for Categories 1–10 (FIGS. 2–5). For Category 12, if the student at or above a set criterion level (e.g., 70% in the preferred embodiment) for both single-and multi-syllable words, the language and literacy specialist moves on to test the student's proficiency in the next category/subcategory. If the student scores less than the criterion level in the category/subcategory, the language and literacy specialist proceeds to step 22, as the answer to the question in step 20 ("Is the target a base word?") will always be "yes" for this category with these results.

In step 22 the language and literacy specialist determines whether there is a phonological awareness skill that could explain the error in the base word. At this point in the method for this category, there is certainly not such a skill. In step 30, the language and literacy specialist then determines whether the subcategory being tested is one with an e-conditioned consonant. If so, then, in step 28, the language and literacy specialist recommends work on orthographic knowledge at the tested syllable level, then returns to step 18 to test another category/subcategory. If, however, the tested subcategory is not one with an e-conditioned consonant, then, in step 32, the language and literacy specialist recommends working on visual storage for the category at the tested syllable level, and also considers whether phonological awareness skills or morphological awareness skills might help for specific words. The language and literacy specialist then returns to step 18 and tests another category/subcategory.

As shown in FIGS. 8 and 9, single- and multi-syllable words are not tested separately in step 18 for Category 13. For Category 13, in step 18 the language and literacy specialist calculates the student's accuracy in the entire category/subcategory. If the student scores at or above a set criterion level (e.g., 70% in the preferred embodiment), the language and literacy specialist moves on to test the student's proficiency in the next category/subcategory. If the student scores less than the criterion level in the category/subcategory, the language and literacy specialist proceeds through step 20 (which will always be answered "no" for Category 13) to step 21 and determine whether the errors were mostly (e.g., more than 50% in the preferred embodiment) in the root words. If the errors were mostly in the root words, then the language and literacy specialist collects more spelling samples of root words from the student, as described further with reference to FIG. 14 below. Upon obtaining the additional spelling samples of root words, the language and literacy specialist determines, in step 27, whether most (e.g., 50% in the preferred embodiment) of these newly-collected root samples were spelled correctly. If most of the words were not spelled correctly, then, in step 29, the language and literacy specialist recommends working on correct spelling of error patterns in base words using the results yielded from Categories 1–12 as described previously before teaching spelling of inflected forms. The language and literacy specialist then returns to step 18 and tests another category/subcategory.

If, however, most of the newly-collected root samples were spelled correctly (step 27), the problem lies in spelling the inflected forms instead of base words themselves, and the language and literacy specialist proceeds through step 34 (which will always be answered "inflected" for Category 13) and, in step 36, analyzes whether there were more than 50% errors on the inflection.

If most of the errors were on the inflection, then, in step 38, the language and literacy specialist determines whether there were mostly (e.g., more than 50% in the preferred embodiment) omission or addition errors or whether there were mostly (e.g., more than 50% in the preferred embodiment) substitution errors. If there were mostly substitution errors, then, in step 42, the language and literacy specialist recommends working on spelling of inflections for the particular subcategory, using morphological awareness, visual storage, and orthographic knowledge.

If, however, there were mostly omission or addition errors (step 38), then, in step 40, the language and literacy specialist determines whether each of the misspelled words had one or more syllables, and assesses segmentation-type phonological awareness for each of the words. This is described further below, with reference to FIGS. 11 and 12. The language and literacy specialist then determines whether the student segmented at least a set criterion level (e.g., 70% in the preferred embodiment) of the assessed words correctly. If the student did segment at or above the criterion level correctly, then, in step 42, the language and literacy specialist recommends working on spelling of inflections for the particular subcategory using morphological awareness, visual storage, and orthographic knowledge.

Regardless of how step 42 was reached, i.e. whether there were mostly substitution errors or whether there were mostly omission or addition errors and the student segmented at ort above the criterion level of the assessed words correctly, the language and literacy specialist then, in step 44, analyzes whether there were more than 50% errors on modification. If there were 50% or fewer errors on modification, the language and literacy specialist returns to step 18 and tests another category/subcategory. If there were mostly (e.g., more than 50% in the preferred embodiment) errors on modification, the language and literacy specialist recommends, in step 46, working on morphological awareness for the subcategory, then returns to step 18 and tests another category/subcategory.

If, however, the student segmented below the criterion level of the assessed words correctly (step 40), the language and literacy specialist, in step 41, recommends working on phonological awareness for the subcategory at the tested syllable level followed by working on spelling the inflection for the subcategory using morphological awareness, visual orthographic images and orthographic knowledge.

As shown in FIG. 10, single- and multi-syllable words are not tested separately in step 18 for Category 14. For Category 14, in step 18 the language and literacy specialist calculates the student's accuracy in the entire category/subcategory. If the student scores at or above a set criterion level (e.g., 70% in the preferred embodiment), the language and literacy specialist moves on to test the student's proficiency in the next category/subcategory. If the student scores less than the criterion level in the category/subcategory, the language and literacy specialist proceeds through step 20 (which will always be answered "no" for Category 14) to step 21 and determine whether the errors were mostly (e.g., more than 50% in the preferred embodiment) in the root words. If the errors were mostly in the root words, then the language and literacy specialist collects more spelling samples of root words from the student, as described further with reference to FIG. 14 below. Upon obtaining the additional spelling samples of root words, the language and literacy specialist determines, in step 27, whether most of (e.g., more than 50% in the preferred embodiment) these newly-collected root samples were spelled correctly. If most of the newly-collected root samples were not spelled correctly, then, in step 29, the language and literacy specialist recommends working on correct spelling of error patterns in base words using the results yielded from Categories 1–12 as described previously before teaching spelling of inflected forms. The language and literacy specialist then returns to step 18 and tests another subcategory. As this is the last category (Category 14), when there are no more subcategories, the method is at an end.

If, however, most of the newly-collected root samples were spelled correctly (step 27), the problem lies in spelling the derived forms themselves, and the language and literacy specialist proceeds through step 34 (which will always be answered "derived" for Category 14) and, in step 48, analyzes whether the student has knowledge of the relationship between the base word and the derived form, as described further with reference to FIG. 15 below.

After assessing knowledge of the relationship between the base word and the derived form, then, still in step 48, the language and literacy specialist scores the student on the relevant morphological awareness skill. If the student scores at least 50% in step 48, then, in step 54, the language and literacy specialist determines whether there were mostly (e.g., more than 50% in the preferred embodiment) errors on the modification of the base word to spell the derived form. If there were mostly errors in modification in step 54, then, in step 52, the language and literacy specialist recommends working on spelling of derived forms for the particular subcategory using visual storage. If there were mostly not errors in modification in step 54, then, in step 56, the language and literacy specialist recommends working on spelling of the derivational pattern for the particular subcategory using visual storage.

If, however, the student scores below the criterion level in step 48, then, in step 50, the language and literacy specialist recommends working on teaching the relationship between the root and the derived form for the particular subcategory, followed by the working on the spelling of derived forms for the particular subcategory using visual storage (step 52).

Figure 11:
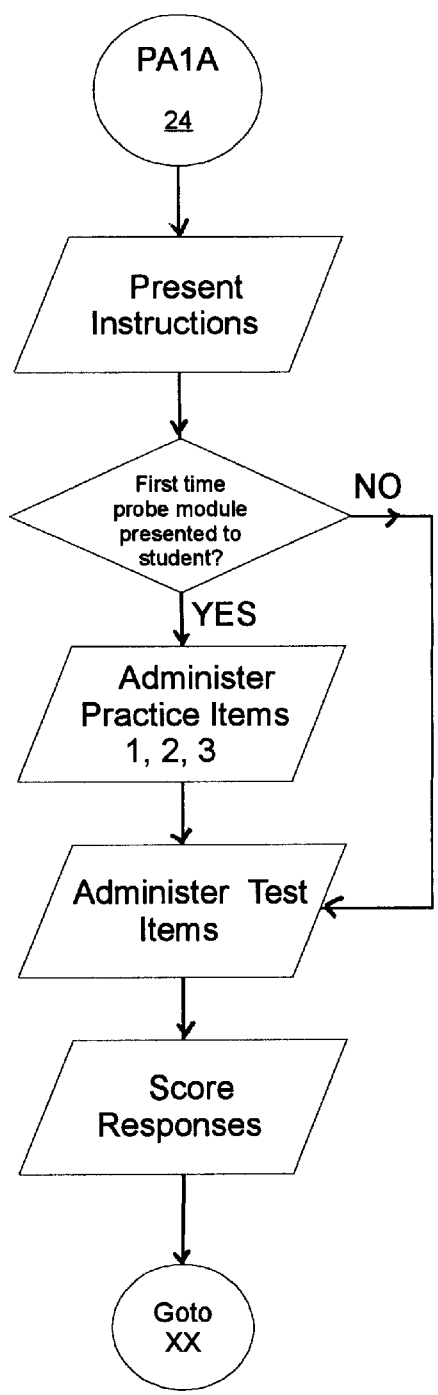
FIG. 11 is a flow diagram for a subroutine to be used with FIGS. 2, 3, 4, and 9.

As referred to above with reference to FIGS. 2, 3, 4, and 9, and as shown in FIG. 11, in step 24 a series of substeps are performed. Initially, instructions are presented to the student. If this is the first time the module is being presented to the student, then practice items are administered to the student. The test items are then administered to the student, the student's responses are scored, and it is determined whether the student scored at or above a set criterion level (e.g., 70% in the preferred embodiment) correct (returning to FIG. 2, 3, 4, or 9, as described above). The test items administered in step 24 consist of those words misspelled by the student and, for Categories 1–3, 4–6, 7–9 and for Category 13 when the target word is a single syllable word, the student is asked to segment the phonemes in the target word. For example, when it is determined in step 22 (FIG. 2) that the student misspelled the word "say" as "ay" the student is asked to segment the word "say" into the phonemes /s-e/ in step 24.

Figure 12:
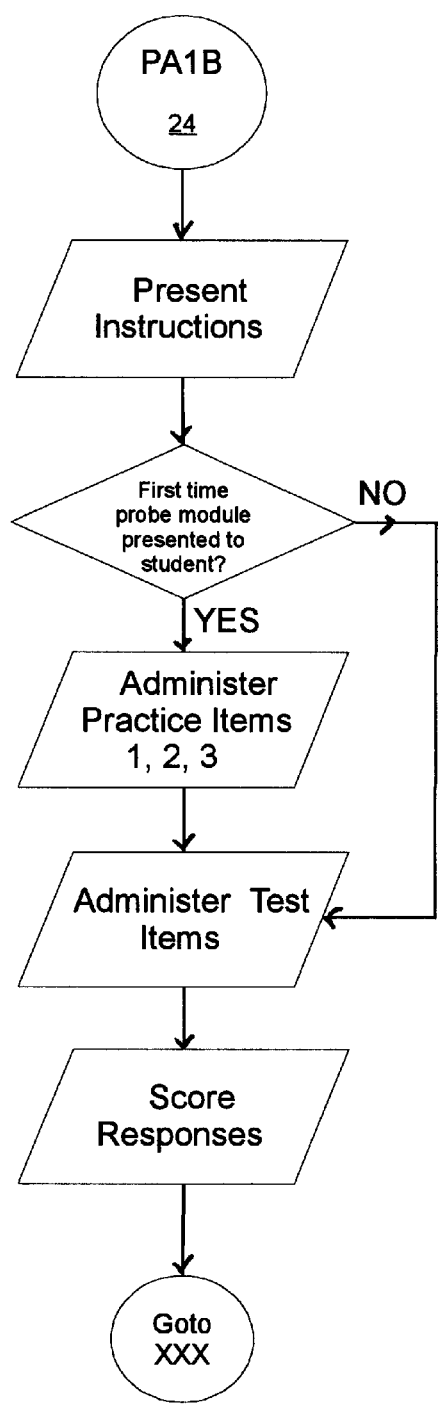
FIG. 12 is a flow diagram for a subroutine to be used with FIGS. 6 and 9.

As referred to above with reference to FIGS. 6 and 9, and as shown in FIG. 12, in step 24 a series of substeps are performed. Initially, instructions are presented to the student. If this is the first time the module is being presented to the student, then practice items are administered to the student. The test items are then administered to the student, the student's responses are scored, and it is determined whether the student scored at or above a set criterion level (e.g., 70% in the preferred embodiment) correct (returning to FIGS. 6 or 9, as described above). The test items administered in step 24 consist of those words misspelled by the student and, for Category 11 and for Category 13 when the target word is a multi-syllabic word, the student is asked to segment the syllables in the target word. For example, when it is determined in step 40 (FIG. 9) that the student misspelled the word "walking" as "walk" the student is asked to segment the word "walking" into the syllables "walking" in step 24.

Figure 13:
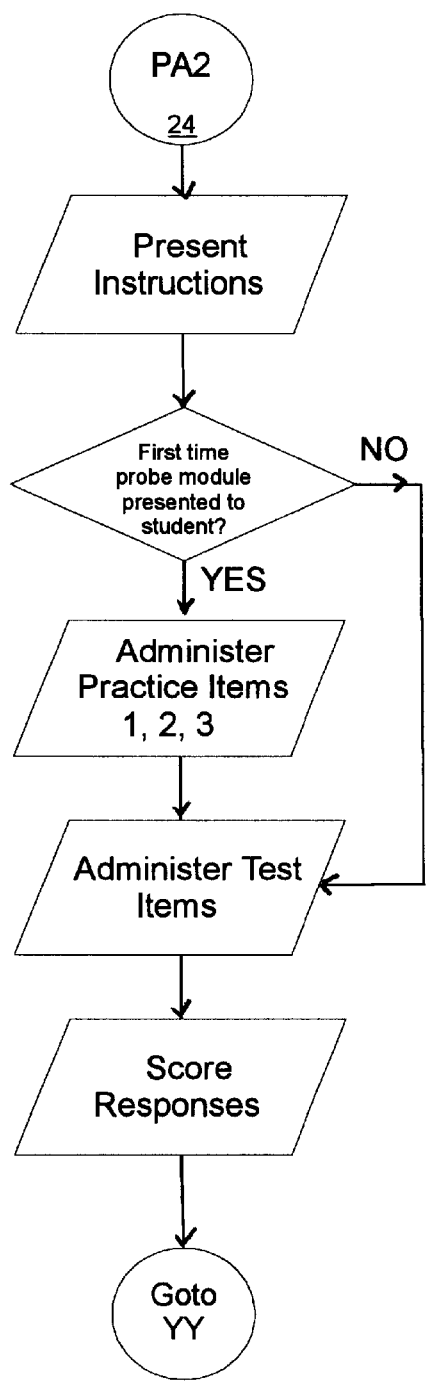
FIG. 13 is a flow diagram for a subroutine to be used with FIGS. 3 and 5.

As referred to above with reference to FIGS. 3 and 5, and as shown in FIG. 13, in step 24 a series of substeps are performed. Initially, instructions are presented to the student. If this is the first time the module is being presented to the student, then practice items are administered to the student. The test items are then administered to the student, the student's responses are scored, and it is determined whether the student scored at or above a set criterion level (e.g., 70% in the preferred embodiment) correct (returning to FIG. 3 or 5, as described above). The test items administered in step 24 consist of word pairs that represent the misspellings by the student and the student is asked to discriminate whether the pair of words are the same or different. For Categories 4–6 the word pairs represent the target vowel and the vowel represented in the student's misspellings. For example, the word pair "bit-bet" would be presented when it is determined in step 22 (FIG. 3) that the student consistently misspelled the short vowel 'e' with the letter 'i'. In Category 10, the word pairs consist of the target word and the target word without the liquid phoneme, for example "church" vs. "chuch" or "bottle" vs. "botte" would be presented when it is determined in step 22 (FIG. 5) that the student omits the letter 'r' or 'l' representing the liquid phoneme in the target word.

Figure 14:
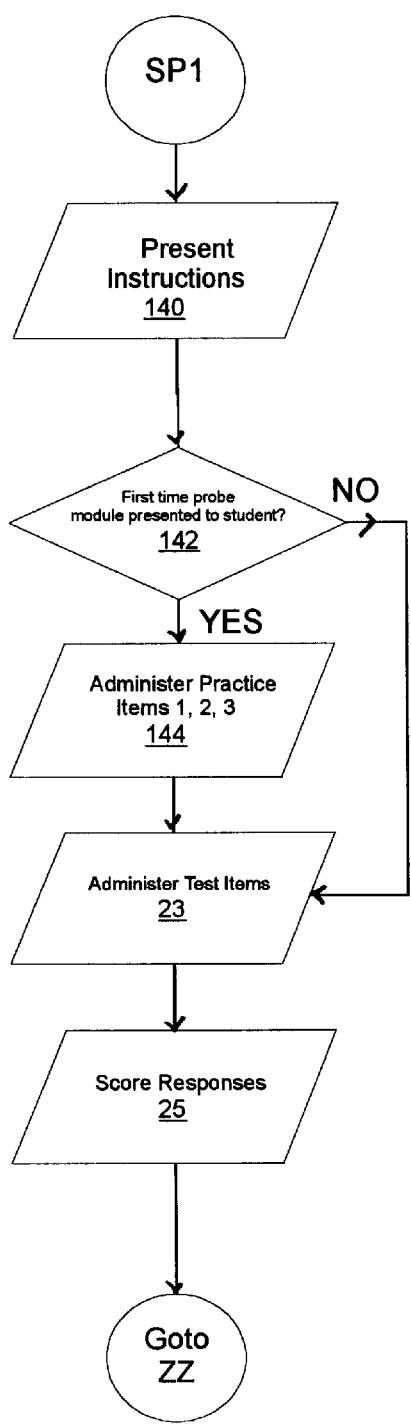
FIG. 14 is a flow diagram for a subroutine to be used with FIGS. 8 and 10.

As referred to above with reference to FIGS. 8 and 10, and as shown in FIG. 14, in step 140 instructions are presented to the student. If this is the first time the module is being presented to the student, then practice items are administered to the student (steps 142, 144). The test items are then administered to the student in step 23, the responses are scored in step 25, and it is determined whether the student scored at or above a set criterion level (e.g., 50% in the preferred embodiment) correct (step 27, returning to FIG. 8 or 10, as described above). The test items administered in step 23 consist of the base words of those inflected or derived words misspelled by the student in Category 13 and Category 14, respectively, and the student is asked to spell the base word. For example, when it is determined in Step 21 (FIG. 8) that the student misspelled the root in the word "stopped", the student is asked to spell the base word "stop" in step 23.

Figure 15:
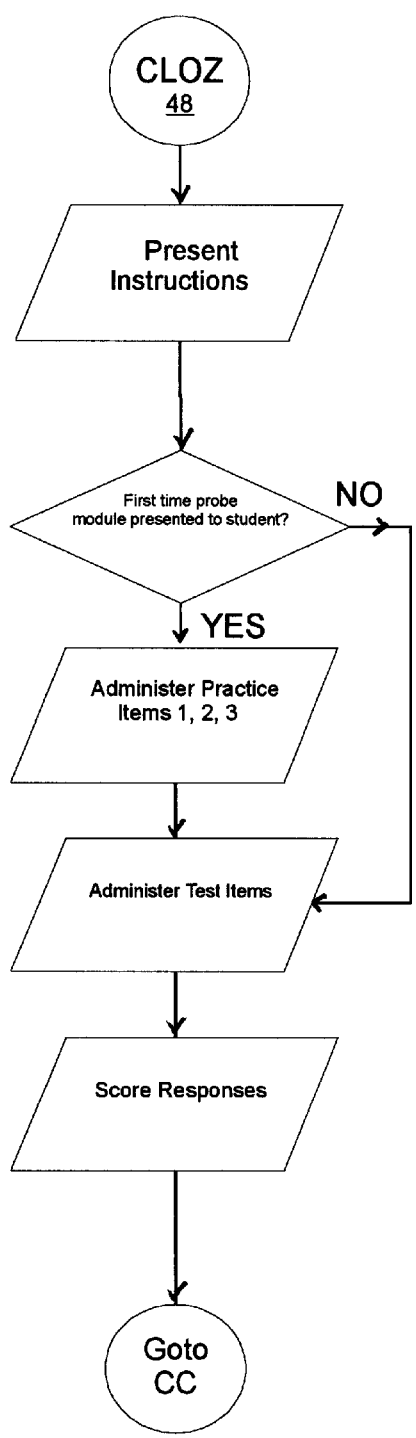
FIG. 15 is a flow diagram for a subroutine to be used with FIG. 10.

As referred to above with reference to FIG. 10, and as shown in FIG. 15, in step 48 a series of substeps are performed. Initially, instructions are presented to the student. If this is the first time the module is being presented to the student, then practice items are administered to the student. The test items are then administered to the student, the student's responses are scored, and it is determined whether the student scored mostly (e.g., more than 50% in the preferred embodiment) correct (returning to FIG. 10, as described above). The test items administered in step 48 consist of the derived words misspelled by the student and the student is asked to complete a cloze task in which the student identifies the related base words to demonstrate knowledge of the relationship between the root and the derivation. For example, when it is determined in Step 27 (FIG. 10) that the student can correctly spell the root word "magic" although s/he misspelled the derived form "magician", the student is then asked to complete the following in step 23: "David Copperfield is a magician" He does __"

Figure 16:
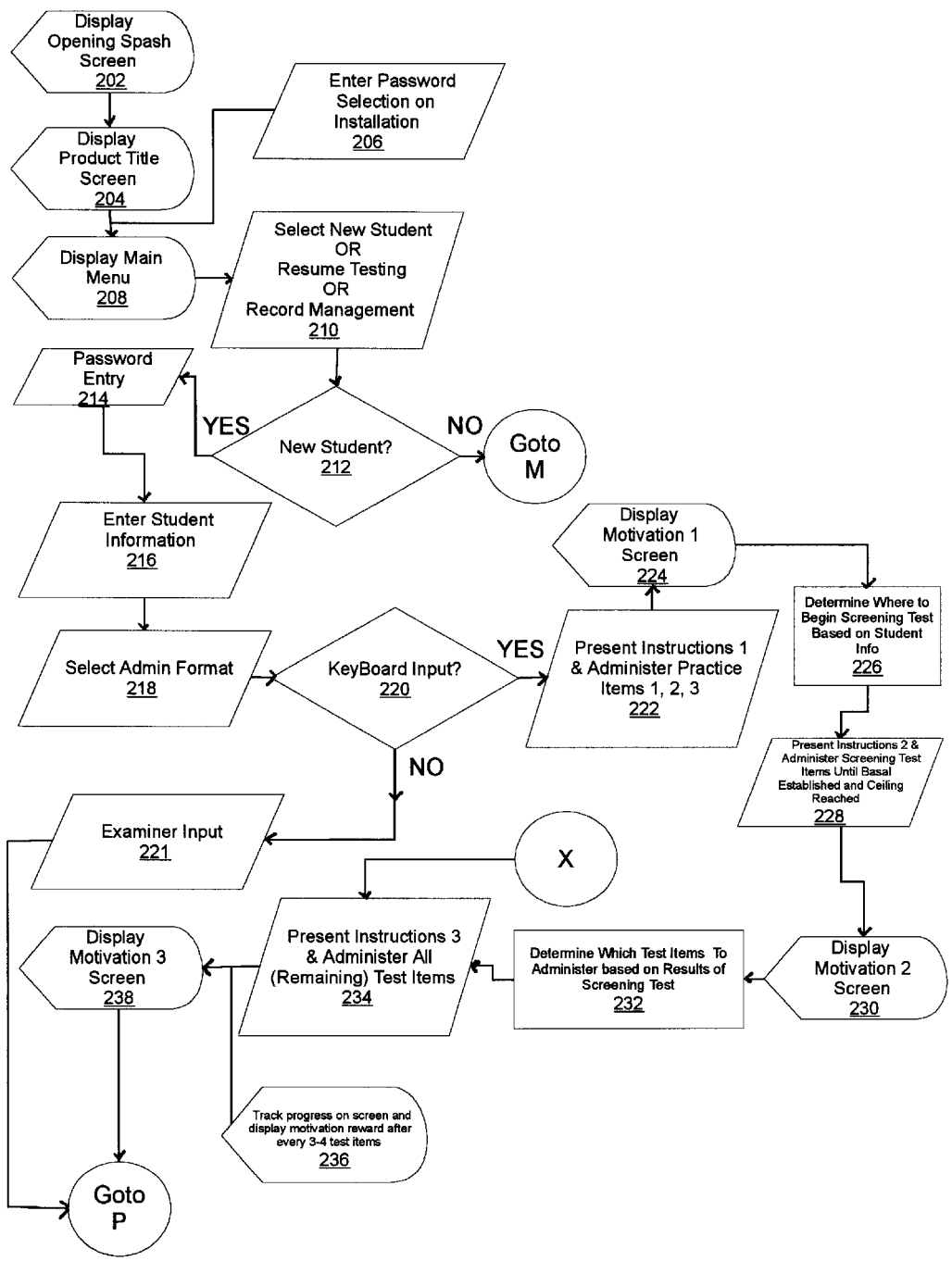
FIG. 16 is a flow diagram for an initial module in accordance with a second embodiment of the present invention.
Figure 17:
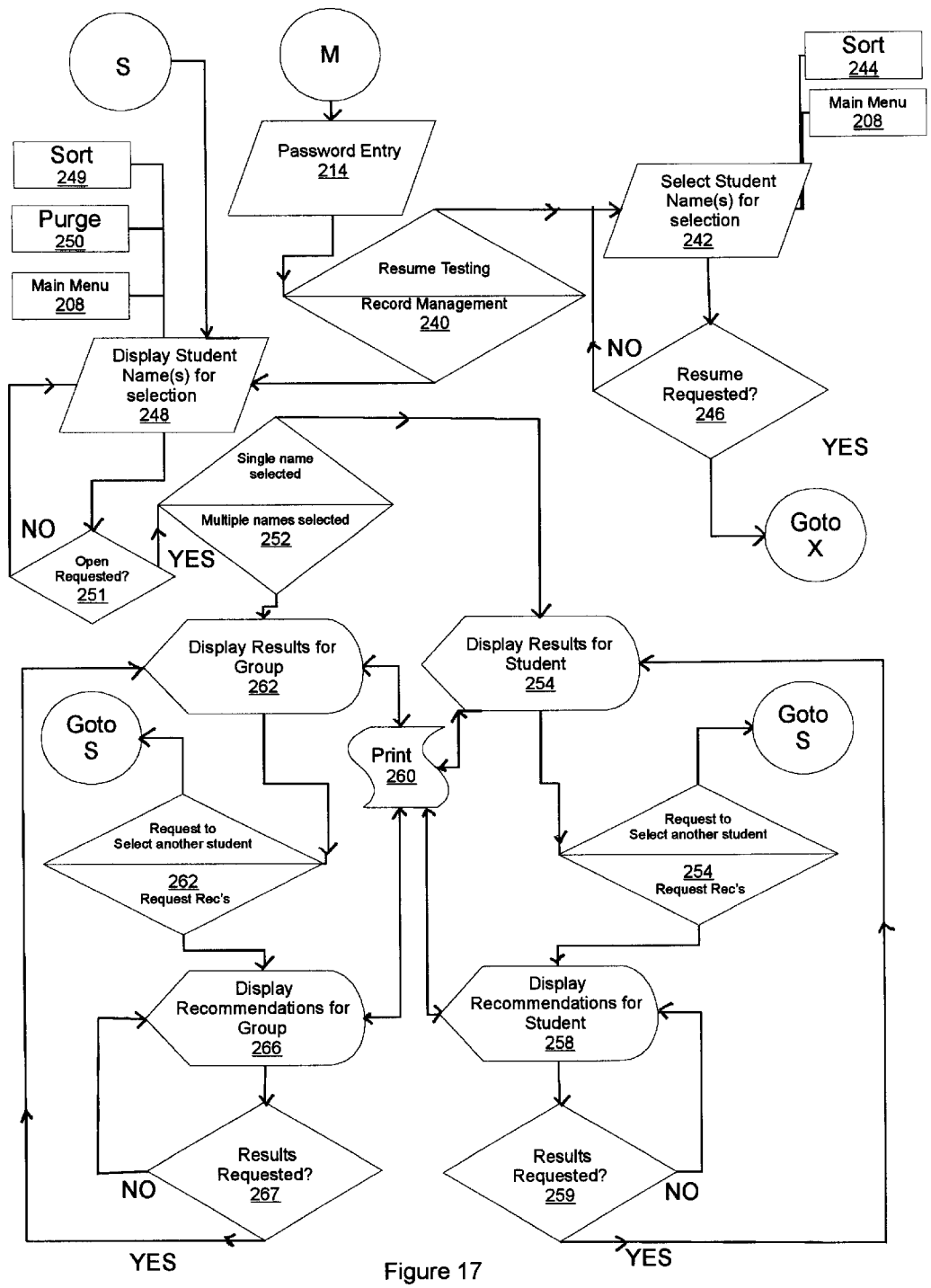
FIG. 17 is a flow diagram for a subroutine to be used with FIG. 16.
Figure 18:
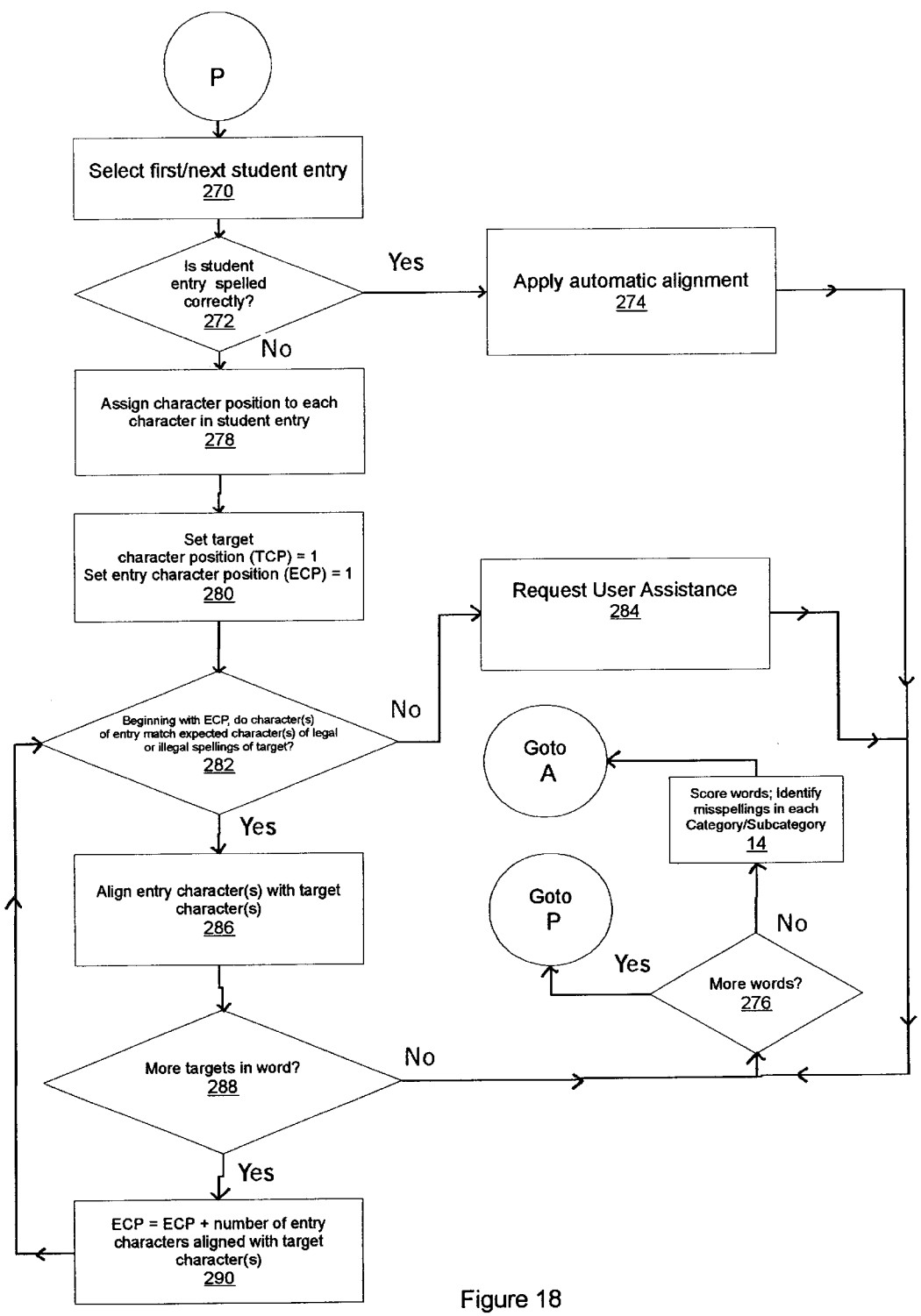
FIG. 18 is a flow diagram for a subroutine to be used with FIG. 16.

In a second embodiment of the present invention, the method described above is implemented in an apparatus 200 that comprises, preferably, computer software for interactive testing. In addition to the above method, the software also performs initial processing, as shown in FIGS. 16–18. In step 202, the software displays an initial title screen to the user of the software, typically a language and literacy specialist. In step 204, the software displays a second title screen and, the initial time the software is being used, asks the user to create and enter a password. In step 206, the user creates and enters a new password, which will then be asked for each time the software is used.

Each time through the software, in step 208 the main menu is displayed. In step 210, the user chooses one of three functions from the main menu, the three functions being selecting a new student, resuming testing for an existing student, or managing records. The software interprets in step 212 which of the three options the user chose.

If the user chooses selecting a new student, then, in step 214, the user enters a password, which must match the password entered the initial time through the software. In step 216, the user enters student information for the new student. In step 218, the user selects a format in which the spelling test will be administered to the student; the choices being keyboard input, i.e. the software presents questions to the student who then types the answers directly into the software on a keyboard, or examiner input, in which case the user administers the spelling test to the student and then enters the results into the software at the end. The selection between keyboard input and examiner input is determined in step 220.

If the user chooses keyboard input, then in step 222 a first set of instructions is displayed to the student and practice items are administered to the student. In step 224, a first motivational screen is displayed to the student. In step 226, it is determined where to start testing the student, based on the student information entered in step 216. In step 228, a second set of instructions is presented to the student and screening test items are administered to the student until a basal is established and a ceiling is reached. In step 230, a second motivational screen is displayed to the student. In step 232, it is determined which test items to administer to the student, based on the result of the screening test in step 228.

Step 234 is an iterative process. In step 234, a third set of instructions is presented to the student, and all test items, or all remaining test items in the case of a resuming student (see below), are administered to the student. The student's progress through the test items is monitored and the number of iterations of step 234 are counted in step 236, and in step 238 a third motivational screen is displayed to the student periodically, typically after every third or fourth test item. When the student has completed all test items, the results are parsed, as described below with reference to FIG. 18.

If the user chooses the "resume testing" option or the "record management" option from the main menu in step 210 (see above), the software recognizes this in step 212. Turning now to FIG. 17, in step 214 the user enters a password, which must match the password entered the initial time through the software. In step 240, it is determined whether the option chosen in step 210 was "resume testing" or "record management." If the option selected was "resume testing," then, in step 242 the list of students who have begun but not yet completed testing is displayed on screen. In step 244, the student records may be sorted by the user for ease of locating the desired student record. When a student record is selected (step 246) the selected record is opened and processing continues in step 234 (FIG. 16) as described above. The list of student names remains displayed until a name is selected in step 242 and resume testing is requested in step 246 or until the user chooses to exit step 242 and return to step 208, the Main Menu, described above.

Still in FIG. 17, if the option recognized in step 240 is "record management," then, in step 248, the list of students who have completed testing is displayed on screen. In step 248, the student records may be sorted by the user for ease of locating the desired student record or records (step 249). When one or more student records are selected in step 248 the selected record(s) may be purged (step 250) or opened (step 251). The list of student names remains displayed until a name or group of names is selected in step 248 and open record(s) is requested in step 251 or until the user, chooses to exit step 248 and return to step 208, the Main Menu, described above. When the user selects to open a record, then, in step 252, it is determined whether the user selected to open a record for a single student or to open records for a group of students. If a record for a single student was selected, then, in step 254, the results for the student are displayed. In step 254 the results on screen may be printed by selecting step 260. In step 254, the user is asked whether the user wishes to see recommendations (step 256) from the software regarding this student. If the user wants to see recommendations, then, in steps 258 and 260, the recommendations are displayed and printed out respectively. The display of results (step 254) remains on screen until the user either selects to display the recommendations (step 256) or exit the display of results and return to the student list (step 248) to either select another student or group of students or return to the Main Menu as described above. Once the user selects from step 256 to view the recommendations, then the display of recommendations (step 258) remains on screen until the user selects in step 259 to return to step 254 and re-display the results or to return to step 248. Analogous processing to that described above regarding steps 254–259 for individual students is performed for groups of students in steps 262–267, respectively.

Returning to FIG. 16, if it is determined in step 220 that the user selected "examiner input" in step 218, then, in step 221, the examiner inputs the results of the test administered to the student manually or by some other means, then proceeds to the processing in FIG. 18 directly rather than going through steps 222–238 in FIG. 16.

Turning now to FIG. 18, when all the test items have been completed and entered, whether by keyboard input or by examiner input, then, in step 270, the user selects a word the student spelled. In step 272 it is determined whether the word selected in step 270 is spelled correctly. If the word is spelled correctly, then, in step 274, each letter or group of letters, or first unit, in the student's spelling of the word is automatically aligned with the corresponding letter or group of letters, or second unit, for the various categories/subcategories in the target word. For example, using the student's correct spelling of "bath", the 'b' is aligned with the first letter in the target word which is classified as Category 1 (Consonants), Subcategory 1 (Letter sound in initial position of letter name), the 'a' is aligned with the second letter in the target word which is classified as Category 4 (Short Vowels), Subcategory 1 (short vowel 'a') and the letters 'th' are aligned with the final two letters in the target word which are classified as Category 2 (Consonant Digraphs), Subcategory 11 (final th). In step 276, it is determined whether more words remain to be analyzed. If more words do remain to be analyzed, another word is selected in step 270. When no more words remain to be selected, the student's spelling for each category/subcategory in each word is scored (correct vs. incorrect) across all words in step 14 and the assessment method described above is entered in step 16.

If it is determined in step 272 that the word was not spelled correctly, then, in step 278, a character position is assigned to each character in the student entry (the student's incorrect spelling of the word). In step 280, both a target character position and an entry character position are set to 1. The target character position marks a character position within the correct spelling of the target word, and the entry character position marks a character position within the student's misspelling of the target word. In an iterative process encompassing steps 282, 284, 286, 288, and 290, the misspelled word is analyzed character by character to align each letter in the student's entry with the corresponding target letter or group of letters in the correct spelling of the target word. In step 282, the characters beginning with the current entry character position are examined to determine whether the character(s) matches an expected legal or illegal spelling of the target character in that same position of the target word. If it does not match, this is an error condition and, in step 284, the user must intervene to complete the alignment of the student's entry with the correct spelling of the target word. If it is determined in step 282 that there is a match, then, in step 286, entry character(s) are aligned with target character(s). In step 288 it is then determined whether there are more targets in the word. If no more targets exist in the word, then, in step 276, it is determined whether more words exist and processing continues as described above. If, however, it is determined in step 288 that more targets do exist in the current word, then, in step 290, the entry character position is incremented by the number of entry characters aligned with the target character(s) in step 286 and more testing is performed in step 282 as described above.

EXPERIMENTS

To illustrate the use of the present invention, three experiments are presented: a third grade student with error patterns on root words; a sixth grade student with an error pattern on inflected words; and a seventh grader student with an error pattern on derived words. In all three cases, the student' spelling skills were found to be deficient, and multiple spelling samples were collected. These experiments are used to illustrate how analysis of the error patterns leads to formation of intervention goals and methods.

Experiment One

The third grade student, Paige, presented with several error patterns on root words, including dropping of nasals in nasal+stop consonant clusters (e.g., bod for bond), and consistent use of e for words containing the target vowel /I/. Steps toward identifying the cause of these error patterns involved determining the student's phonological awareness skills and their possible impact on his spelling abilities.
Phonological Awareness Skills Testing The language and literacy specialist identified that segmenting clusters into individual consonants was required to spell nasal+stop consonant clusters. A search of the spelling samples revealed two out of 20 instances of correct spelling of nasal+stop consonant clusters. Both of these instances (traned for trained, trimed for trimmed) involved inflectional morphology, suggesting that Paige's knowledge of inflectional morphemes influenced her spelling of these particular nasal+stop consonant clusters. A segmenting task administered from a standardized phonological awareness test provided 3 opportunities for the student to segment nasal+stop consonant clusters. These three words were segmented incorrectly. For example, Paige was given the word camp and asked to segment it into individuals sounds. She responded by producing /k/, /ae/, /p/. Given that there were only three opportunities, the language and literacy specialist decided to supplement with an additional data. Paige was asked to segment 12 words that contained nasal+stop consonant clusters. Half of the words were one morpheme words (e.g., land) and half were two morpheme words (e.g., fanned). Results revealed consistent errors on all one-morpheme words and inconsistent errors on the two-morpheme words. Consequently, the language and literacy specialist determined that Paige needed to further develop her phonological awareness of nasal+stop consonant clusters in base words and planned segmenting activities for intervention.

Phonetic similarity often plays a role in early misspellings. Thus, it was no surprise that Paige consistently used e to spell the /I/ sound, since the letter name (i.e., /i/) and the target vowel (/I/) share the same classifications in vowel height, advancement, and roundedness. First, the language and literacy specialist wanted to make sure that Paige could perceive the differences between the two phonemes /ε/ and /I/. The language and literacy specialist then needed to see whether Paige recognized that that the two phonemes were represented by the different graphemes, e and i and understood that the differential use of these graphemes/phonemes resulted in meaningful, semantic differences. A search of the spelling samples revealed consistent use of e for /I/, as well as /i/ and /ε/ target vowels. A specific sorting (or identification) task was developed using words that differed by the vowel only (e.g., dip, deep, fit, feet, lid, lead). The distinction between /I/ and /ε/ was no problem for Paige; however, she struggled with the difference between /i/ and /I/ words. That is, she did not consistently sort words with each type of vowel sound into the indicated category. The language and literacy specialist decided to focus on increasing Paige's awareness of this phonological contrast by incorporating activities contrasting the sounds as well as the graphemes that represented each. The language and literacy specialist hoped that the work on the orthographic concept would help to make Paige more explicitly aware of the phonological contrast.

Experiment Two

The sixth grade student, Sarah Anne, presented with several error patterns on inflected and derived words, including the use of the grapheme s to spell all plural nouns (e.g., cats for cats, buss for busses). Because this particular error pattern involved inflectional morphology, the language and literacy specialist evaluated Sarah Anne's knowledge of inflectional morphology and its possible impact on her spelling abilities. A search of the spelling samples collected indicated that she consistently used the grapheme '-s' when '-es' was required (e.g., buzzs for buzzes, brushs for brushes). Thus, the error pattern involved both an error on the spelling of the inflection as well as an apparent lack of understanding regarding the orthographic rules governing the pluralization of words. The language and literacy specialist set a goal of facilitating the rule for using 'es' to mark plurals (e.g., when pluralizing words ending in sibilants, long /o/) and how to spell that particular inflection.

Experiment Three

Shawn, a seventh grade student, also presented with several error patterns, most of which involved derivational morphology. For example, one of his error patterns was the consistent deletion of the initial consonant of root words when adding prefixes (e.g., unatural for unnatural, mispell for misspell). Initially, the language and literacy specialist searched Shawn's writing samples to determine that the error pattern was indeed a problem with derivational morphology and not with the root word. Finding examples of the root words correctly spelled confirmed that his error pattern was derivational in nature. Next, to determine the cause of this error pattern, the language and literacy specialist examined whether Shawn was aware of the relationship between the misspelled derived words and their roots. An additional search of the spelling samples revealed two incidences of correctly spelled prefix+root word combinations. For both of these instances, the prefixes were the same as those in the misspelled words but the root words began with vowels (e.g., uneasy, reissue). Thus, it appeared that Shawn understood the relationship between the root words and their derived forms as well as how to apply the prefixes in specific cases. To confirm these findings, an informal follow-up probe, using a cloze procedure, was constructed. Shawn was asked to write a root word, then was given a sentence which required him to fill in a word using a derived form (e.g., "Inform. I was given the wrong information. I was __.") Some of the root words used began with vowels (e.g., inform) and others began with consonants (e.g., deny). Shawn correctly spelled all root words and the derived words whose roots began with a vowel. All other words were spelled incorrectly, following the error pattern previously identified. This informal probe confirmed that Shawn knew the relationship between the root word and the derived form and understood in some cases how to apply the derivational pattern. Thus, the goal of intervention was to further develop his understanding of the derivational rule for adding prefixes (i.e., when adding a prefix, do not change the spelling of any root word).

As a practitioner of ordinary skill in the art will realize, the present invention is capable of many variations, including but not limited to the use of speech recognition and handwriting scan input devices. All such variations to the invention come within the scope of the present invention. Results may be exported from the assessment into a separate training system. The device may also be used as a teaching tool. The system may be implemented on computer networks, such as Web, Internet, Local Area Network and the like.

TABLE 1

| | Primary spelling inventory. | | | | | | | | | |
|---|---|---|---|---|---|---|---|---|---|---|
| | Initial Consonant | Final Consonant | Digraph | Blend | Short Vowel | Long Vowel VC e | Vowel Team Diphthong | R-control Vowel | Inflections | Correct | Word Totals |
| 1. fan | f | N | | | A | | | | | | |
| 2. pet | p | T | | | E | | | | | | |
| 3. dig | d | G | | | I | | | | | | |
| 4. mob | m | B | | | O | | | | | | |
| 5. rope | r | P | | | | o–e | | | | | |
| 6. wait | w | T | | | | | Ai | | | | |
| 7. chunk | | | ch | nk | U | | | | | | |
| 8. sled | | | | sl | E | | | | | | |
| 9. stick | | -ck | | st | I | | | | | | |
| 10. shine | | | sh | | | i–e | | | | | |
| 11. dream | | | | dr | | | Ea | | | | |
| 12. blade | | | | bl | | a–e | | | | | |
| 13. coach | | -ch | | | | | Oa | | | | |
| 14. fright | | | | fr | | | Igh | | | | |
| 15. snowing | | | | sn | | | Ow | | -ing | | |
| 16. talked | | | | | | | -a | | -ed | | |
| 17. camping | | | | -mp | | | | | -ing | | |
| 18. thorn | | | th | | | | | or | | | |
| 19. shouted | | | sh | | | | Ou | | | | |
| 20. spoil | | | | sp | | | Oi | | | | |
| 21. growl | | | | gr | | | Ow | | | | |
| 22. chirp | | | ch | | | | | ir | | | |
| 23. clapped | | | | cl | | | | | -pped | | |
| 24. tries | | | | tr | | | | | -es | | |
| 25. hiking | | | | | | | | | -king | | |
| Feature Totals | | | | | | | | | | | |

TABLE 2

Elementary spelling inventory.

| | Short vowel | Blend/ Digraph | Long Vowel | Other Vowel | Complex Consonant | Inflection | Syllable Juncture | Unaccented Syllable | Suffix | Correct | Word Totals |
|---|---|---|---|---|---|---|---|---|---|---|---|
| 1. speck | e | Sp | | | ck | | | | | | |
| 2. switch | i | Sw | | | tch | | | | | | |
| 3. throat | | | oa | | thr | | | | | | |
| 4. nurse | | | | ur | | | | | | | |
| 5. scrape | | | a–e | | scr | | | | | | |
| 6. charge | | Ch | | ar | ge | ai | | | | | |
| 7. phone | | Ph | o–e | | | | | | | | |
| 8. smudge | u | Sm | | | dge | | | | | | |
| 9. point | | Nt | | oi | | | | | | | |
| 10. squirt | | Squ | | ir | | | | | | | |
| 11. drawing | | Dr | | aw | | -ing | | | | | |
| 12. trapped | | Tr | | | | -pped | | | | | |
| 13. waving | | | | | | -ving | | | | | |
| 14. powerful | | | | ow | | | | -er | -ful | | |
| 15. battle | | | | | | | Tt | -tle | | | |
| 16. fever | | | | | | | V | -er | | | |
| 17. lesson | | | | | | | Ss | -on | | | |
| 18. pennies | | | | | | -ies | Nn | | | | |
| 19. fraction | | | | | | | | | -tion | | |
| 20. sailor | | | | | | | L | | -or | | |
| 21. distance | | | | | | | St | | -ance | | |
| 22. confusion | | | | | | | | | -sion | | |
| 23. discovery | | | | | | | | dis- | -ery | | |
| 24. resident | | | | | | | | si | -dent | | |
| 25. visible | | | | | | | | | -ible | | |
| Feature Totals | | | | | | | | | | | |

TABLE 3

Outline of content domain in English spelling.

PHONEME-GRAPHEME
CORRESONDENCES
Predictable Spellings

| | |
|---|---|
| Consonants | Him, napkin |
| Vowels | wet, picnic |
| consonant blends | flag, dragon |
| consonant digraphs | chin, fish |

Variant/Conditional
Correspondences

| | |
|---|---|
| consonants | dress, edge, result |
| Vowels | grown, light, explain |
| Blends | blink, square, scary |
| digraphs | which, kitchen |

SYLLABLE PATTERNS

| | |
|---|---|
| Closed (CVC) | sister, September |
| Open (CV) | behind, nobody |
| R-controlled | Fire, porter, care |
| C-le | bugle, treatable |
| Vce | basement, compile |
| Vowel Team | haunted, treasure |
| special syllables | action, atomic |

ORTHOGRAPHIC RULES

| | |
|---|---|
| -ve | have, give, love |
| f, l, s doubling | less, stiff, pull |
| Doubling final consonant | running, fogged |
| change y to i | studious, beautiful |
| drop silent e | baked, coming |
| INFLECTIONS | walked, wanted, dogs, wishes, quickly, using, highest |
| SILENT LETTERS | sign-signal, bomb-bombard |
| IRREGULAR (ODD) SPELLINGS | of, one, enough, friend, said |
| HOMOPHONES | their, there; to, two, too |
| COMPOUNDS | breakfast, fifty-one |
| AFFIXES | predict, protection, vision, enjoyment, attend, appearance |
| GREEK COMBINING FORMS | microscope, psychobiology |

TABLE 4

Categories of spelling errors in the spontaneous writing of adolescents with dyslexia.

ORTHOGRAPHIC (PHONOLOGICALLY ACCURATE) ERRORS

| | |
|---|---|
| Homophones | BY/buy |
| | TO/two |
| | THEN/than |
| Letter Name Strategies | OPNING/opening |
| | REFLXS/reflexes |
| Surface phonetic | ONE/own |
| | TIPE/type |
| | VOLY/volley |
| | CIND/kind |
| Failure to change base when ending was added | HAVEING/having |
| | EASYER/easier |
| Student's pronunciation | RESTERONT/restaurant |
| | LUDGERY/luxury |
| Letter reversals | EMDARASE/embarrass |
| Schwa misspellings | ATTATUDE/attitude |
| | PARANTS/parents |
| Overgeneralization of "silent e" | PLANE/plan |
| | LOTE/lot |
| | HOTELE/hotel |

PHONOLOGICALLY INACCURATE SPELLINGS

Errors on Nasals

| | |
|---|---|
| Omission of nasal after a vowel | KID/kind |
| Omission of nasal after a liquid | LEARD/learned |
| Omission of vowel + nasal | CLING/climbing |
| Substitution of one nasal for another | MANBER/member |
| Omission of entire "ing" ending | COME/coming |
| Insertion of a nasal after a vowel | WOUNLD/would |
| Other | KNOW/known |
| Nasal-Liquid Substitution | AROULD/around |

Errors on Liquids /l/ and /r/

| | |
|---|---|
| Omissions of /l/ before consonants and after vowels | SEFE/self |

TABLE 4-continued

Categories of spelling errors in the spontaneous writing of adolescents with dyslexia.

| | |
|---|---|
| Inserting /r/ or /l/ before a vowel | WROK/work |
| Omission of /r/ after a vowel | DEFENDO/defenders |
| Omission of /l/ or /r/ in a blend | FENDS/friends |
| Insertion of /r/ or /l/ after a vowel | CERPER/cheaper |
| Omission of vowel + liquid | EVY/every |
| Other | ONGUS/orange juice |
| Omission of Non-sonorant Consonants | |
| | |
| Adjacent consonants across syllable boundaries | AFER/after |
| Consonants within clusters | COOT/cost |
| Medial syllable-initial | VEIO/video |
| Word-final | POSITY/positive |
| Consonant Substitutions | ME/be |
| Consonant Additions | BELIEFT/belief |
| Vowel Substitutions | |
| | |
| Stressed vowels | JOIB/job |
| Unstressed vowels | RESIONS/reasons |
| R-controlled vowels | WEREY/worry |
| Deletion of Schwa | MANGED/managed |
| Whole Syllable or Stressed Syllable Deletion | COLORDO/Colorado |
| Sequence | LOST/lots |
| Word Substitutions | CLOSE/cost |
| Multiple Errors, undecipherable | PROTILLY/prosperity |
| MORPHOPHONOLOGICAL ERRORS | |
| Morphophonological Errors on -ed | |
| | |
| Omit -ed | TALK/talked |
| Phonetic sp. of -ed | HELPET/helped |
| | HAPEND/happened |
| Addition of -ed | AFECTIVED/effective |
| Other | SPSTOW/supposed to |
| Morphonological Errors on -s | |
| | |
| Plural /s/ on nouns omitted | GOAL/goals |
| Verb/adverb markers omitted | SKI/skis |
| Contractions with /s/ for "is" | THAT/that's |
| Additions of noun/verb inflections | TEACHERS/teacher |
| | LEVES/leave |
| Other | REASOND/reasons |

TABLE 5

| Category | Subcategories | |
|---|---|---|
| (1) Consonants | (1) | Sound in initial position in letter name (b, d, p, t, v, z) |
| | (2) | Sound in final position in letter name (f, m, n, x) |
| | (3) | Liquid |
| | (4) | Sound not in name (w, y) |
| | (5) | /k/ = c |
| | (6) | /k/ = k |
| | (7) | /s/ = c |
| | (8) | /s/ = s |
| | (9) | /z/ = s |
| | (10) | /dʒ/ = j |
| | (11) | /dʒ/ = g |
| | (12) | Flaps |
| | (13) | Other |
| | (14) | Atypical because of derivation |
| (2) Consonant Digraphs | (1) | ng |
| | (2) | wh |
| | (3) | gh |
| | (4) | ph |
| | (5) | sh |
| | (6) | initial ch |
| | (7) | final ch |
| | (8) | tch |
| | (9) | dge |
| | (10) | ck |
| | (11) | |

TABLE 5-continued

| Category | Subcategories | |
|---|---|---|
| (3) Within Word Doubling | (1) | pp |
| | (2) | bb |
| | (3) | tt |
| | (4) | dd |
| | (5) | nn |
| | (6) | mm |
| | (7) | ff |
| | (8) | ss |
| | (9) | ll |
| | (10) | rr |
| (4) Short Vowels | (1) | /æ/ |
| | (2) | /E/ |
| | (3) | /I/ |
| | (4) | /ʌ/ |
| | (5) | /ɑ/-o |
| | (6) | /ɑ/-a |
| (5) Long Vowels | (1) | /e/-a |
| | (2) | /e/-aCe |
| | (3) | /e/-ey |
| | (4) | /e/-ai |
| | (5) | /i/-e |
| | (6) | /i/-eCe |
| | (7) | /i/-ee |
| | (8) | /i/-ea |
| | (9) | /i/-y |
| | (10) | /i/-ey |
| | (11) | /i/-ie |
| | (12) | /ai/-i |
| | (13) | /ai/-iCe |
| | (14) | /ai/-y |
| | (15) | /ai/-ie |
| | (16) | /ai/-igh |
| | (17) | /o/-o |
| | (18) | /o/-oCe |
| | (19) | /o/-oa |
| | (20) | /o/-ough |
| | (21) | /o/-ow |
| | (22) | /u,ju/-u |
| | (23) | /u,ju/-uCe |
| | (24) | /u,ju/-ue |
| | (25) | /u/-oo |
| | (26) | /u/-o |
| | (27) | /u/-ui |
| (6) Other Vowels | (1) | /ɔ/-au |
| | (2) | /ɔ/-o |
| | (3) | /ɔ/-aw |
| | (4) | /U/-u |
| | (5) | /U/-oo |
| | (6) | /ɔI/-oy |
| | (7) | /ɔI/-oi |
| | (8) | /ɑU/-ou |
| (7) Nasal + Consonant Clusters | (1) | n + stop |
| | (2) | n + fricative |
| | (3) | m + stop |
| | (4) | m + fricative |
| | (5) | /ŋ/ + stop |
| (8) Liquid Clusters | (1) | Consonant + R |
| | (2) | Consonant + L |
| | (3) | R + Consonant |
| | (4) | L + Consonant |
| (9) S Clusters + Abutting Consonants | (1) | s + stop |
| | (2) | sL |
| | (3) | sw |
| | (4) | sCC |
| | (5) | Abutting |
| (10) Schwar & Schwal | (1) | /ɔ/-er |
| | (2) | /ɔ/-ir |
| | (3) | /ɔ/-ur |
| | (4) | /ɔ/-ear |
| | (5) | /ɔ/-or |
| | (6) | el |
| | (7) | ial |
| | (8) | al |
| | (9) | le |

TABLE 5-continued

| Category | Subcategories |
|---|---|
| (11) Unstressed Schwa | (1) 2-syllable word |
| | (2) 3-syllable word |
| | (3) 4-syllable word |
| | (4) Schwa in derivation/inflection, not rest of word |
| (12) Silent Consonants and Vowels Affecting Consonants | (1) e conditions consonant |
| | (2) sc- |
| | (3) se |
| | (4) re |
| | (5) lf/lves |
| | (6) mb |
| | (7) s(t)le |
| | (8) ow |
| | (9) semantic & grammatical |
| | (10) vowel + gh |
| | (11) kn |
| | (12) wr |
| (13) Inflections | (1) Short Vowel + ed/ing |
| | (2) Long Vowel + ed/ing |
| | (3) Add s/es for Plural or 3$^{rd}$ person present singular |
| | (4) Change y-->ies for Plural or 3$^{rd}$ person present singular |
| | (5) Change f-->v for plural or 3$^{rd}$ person present singular |
| | (6) Irregular Forms |
| (14) Derivations | (1) Transparent-No Change |
| | (2) Transparent with Phonological Change |
| | (3) Transparent with Orthographic Change |
| | (4) Opaque Change |

TABLE 6

| Category | Omission (Step 22) | Example | Addition (Step 22) | Example | Substitution (Step 22) | Example |
|---|---|---|---|---|---|---|
| (1) Consonants | no entry for C | "ay" for "say" | C entry contains target plus one or more C's provided that C's are not sh, ch, th, or wh | "sray" for "bay" OR "zday" for "say" | C entry does not contain target unless C entry = sh, ch, th, wh | "pay" for "bay" OR "shay" for "say" |
| (2) Consonant Digraphs | no entry for C | "ow" for "show" | C entry contains target plus one or more C's OR two or more C's other than sh, ch, th, wh | "shnow" for "show" OR "stow" for "show" | C entry does not contain target | "sow" for "show" OR "chow" for "show" |
| (3) Within Word Doubling | no entry for C | "ler" for "letter" | C entry contains target plus one or more C's | "lender" for "letter" | C entry does not contain target | "ledder" for "letter" OR "leder" for "letter" OR "leter" for "letter" |

TABLE 7

| Category | Omission (Step 22) | Example | Legal Spellings (Step 22) | Example | Non-Legal Spellings (Step 22) | Example |
|---|---|---|---|---|---|---|
| (4) Short Vowels | no entry for V | "bt" for "bit" | listed in db for each word | "byt" for "bit" | any other spelling of V not listed in db for specific word | "but" for "bit" |
| (5) Long Vowels | no entry for V | "bt" for "bite" | listed in db for each word | "byt" for "bite" | any other spelling of V not listed in db for specific word | "bate" for "bite" |
| (6) Other Vowels | no entry for V | "bt" for "bought" | listed in db for each word | "bawt" for "bought" | any other spelling of V not listed in db for specific word | "boight" for "bought" |

TABLE 8

| Category | Omission (or partial omission) (Step 22) | Example | Addition (Step 22) | Example | Substitution (Step 22) | Example |
|---|---|---|---|---|---|---|
| (7) Nasal + Consonant Cluster | no entry (or C entry contains only some of targets) | "plan" for "plank" OR "pla" for "plank" | C entry contains target CC plus one or more C's | "plankt" for "plank" | C entry does not contain any of targets | "plamg" for "plank" OR "plam" for "plank" |
| (8) Liquid Cluster | no entry (or C entry contains only some of targets) | "rick" for "brick"OR "ick" for "brick" | C entry contains target CC plus one or more C's | "pbrick" for "brick" | C entry does not contain any of targets | "pick" for "brick" OR "brick" for "brick" |
| (9) S cluster & Abutting Consonants | no entry (or C entry contains only some of targets) Words flagged as containing consonant digraphs (digraph flag = yes) will use defined list of possible partial omissions for scoring | "ke" for "kept" OR "oat" for "throat" OR "kep" for "kept" (OR "roat" for "throat" OR "toat" for "throat")** | C entry contains target CC plus one or more C's | "stdop" for "stop" OR "kebpt" for "kept" | C entry does not contain any of targets | "fop" for "stop"OR "kebd" for "kept" |

TABLE 9

| Category | Omission of liquid (Step 22) | Example | Omission of vowel (Step 30) | Example | liquid + vowel (Step 30) | Example |
|---|---|---|---|---|---|---|
| (10) Schwar & Schwal | entry contains no R (or L) | "chuch" for "church" | entry contains no V | "chrch" for "church" | Reversal of R or L with vowel | "father" for "father" OR "bottel" for "bottle" |
| | Extra Vowel (Step 30) | Example | Legal Misspelling (Step 30) | Example | | |
| | entry contains target V plus one or more V's | "chiurch" for "church" OR "camiel" for "camel" | listed in db for each word | "cherch" for "church" | — | — |

TABLE 10

| Category | Omission (Step 22) | Example | Substitution (Step 22) | Example | | |
|---|---|---|---|---|---|---|
| (11) Schwa | no entry for V | "bout" for "about" | V entry is not the same as target V | "ubout" for "about" | — | — |

TABLE 11

| Category | n/a | n/a | n/a | n/a | n/a | n/a | 50 |
|---|---|---|---|---|---|---|---|
| (12) Silent Consonants and Vowels affecting Consonants | — | — | — | — | — | — | |

TABLE 12

| Category | Error on Base Word (Step 21) | Example | Error on Modification (Step 44) | Example | Error on Inflection (Step 36) | Example |
|---|---|---|---|---|---|---|
| (13) Inflected Words | Base entry does not match base target | "comed" for "combed" OR "kombed" for "combed" OR | Modification entry does not match modification target | "hoped" for "hopped" OR "halfes" for "halves" | Inflection entry does not match inflection target | "stoppt" for "stopped" |
| | Omission | Example | Addition | Example | Substitution | Example |

TABLE 12-continued

| Category | Error on Base Word (Step 21) | Example | Error on Modification (Step 44) | Example | Error on Inflection (Step 36) | Example |
|---|---|---|---|---|---|---|
| | (Step 38) No entry for inflection | "comb" for "combed" | (Step 38) Inflection entry contains target inflection plus one or more letters | "stoppedt" for "stopped" | (Step 38) Inflection entry does not contain target inflection | "stoppt" for "stopped" |

TABLE 13

| Category | Error on Base Word (Step 21) | Example | Error on Modification (Step 54) | Example | Error on Derivation (Step 44) | Example |
|---|---|---|---|---|---|---|
| (14) Derivatives | Base entry does not match base target | "magishian" for "magician" OR "cept" for "kept" | Modification entry does not match modification target | "arguement" for "argument" | Derivation entry does not match derivation target | "argumint" for "argument" |

We claim:

1. An apparatus for spelling assessment, the apparatus to be used to assess spelling skills of a student regarding a spelling error in a word, the apparatus comprising:
   (a) an administrative module, the administrative module for administering the functioning of the apparatus;
   (b) a data collection module, the data collection module for collecting spelling samples from at least one person whose spelling skills are being assessed;
   (c) a parsing module, the parsing module for parsing the collected spelling samples; and
   (d) an assessment module, the assessment module for analyzing from said parsing module the spelling skills of at least one person whose spelling skills are being assessed;
   wherein the assessment module comprises:
      (1) an identification module, the identification module for identifying misspelled words;
      (2) a description module, the description module for describing error patterns of the misspelled words;
      (3) a selection module, the selection module for selecting potential treatment targets based upon said error pattern; and
      (4) an analysis module, the analysis module for analyzing whether a correctly spelled form of the misspelled word is a base word.

2. An apparatus for spelling assessment, the apparatus to be used to assess spelling skills of a student regarding a spelling error in a word, the apparatus comprising:
   (a) an administrative module, the administrative module for administering the functioning of the apparatus;
   (b) a data collection module, the data collection module for collecting spelling samples from at least one person whose spelling skills are being assessed;
   (c) a parsing module, the parsing module for parsing the collected spelling samples; and
   (d) an assessment module, the assessment module for analyzing from said parsing module the spelling skills of at least one person whose spelling skills are being assessed;
   wherein the assessment module comprises:
      (1) an identification module, the identification module for identifying misspelled words;
      (2) a description module, the description module for describing error patterns of the misspelled words;
      (3) a selection module, the selection module for selecting potential treatment targets based upon said error patents; and
      (4) an analysis module, the analysis module for analyzing whether a correctly spelled form of the misspelled word is a base word, and, if the correctly spelled form of the misspelled word is not a base word, analyzing whether the correctly spelled form of the misspelled word is derived or inflected.

3. The apparatus of claim 2, wherein the administrative module comprises:
   (a) an initialization module, and
   (b) an output module.

4. The apparatus of claim 3, wherein the output module comprises:
   (a) a display module, and
   (b) a print module.

5. The apparatus of claim 2, wherein the apparatus is adapted to be used to assess spelling skills of both individuals, persons and groups of persons.

6. The apparatus of claim 2, wherein the data collection module is adapted to allow data input by a person whose spelling skills are being assessed or by a person assessing the spelling skills of another.

7. The apparatus of claim 2, wherein the apparatus further comprises a recommendation module, the recommendation module for recommending spelling skills to be worked on for individuals or groups whose spelling skills are being assessed, the recommendations being output by the output module.

8. The apparatus of claim 2, wherein the apparatus is implemented in a computer readable medium.

* * * * *